(12) United States Patent
Parizhisky et al.

(10) Patent No.: US 7,801,227 B2
(45) Date of Patent: Sep. 21, 2010

(54) METHODS AND APPARATUS RELATED TO COMPOSITE BEACON AND WIDEBAND SYNCHRONIZATION SIGNALING

(75) Inventors: Vladimir Parizhisky, New York, NY (US); Rajiv Laroia, Far Hills, NJ (US); Alexander Leonidov, Somerset, NJ (US); Tom Richardson, South Orange, NJ (US); Junyi Li, Bedminister, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1012 days.

(21) Appl. No.: 11/486,881

(22) Filed: Jul. 14, 2006

(65) Prior Publication Data

US 2007/0242765 A1  Oct. 18, 2007

Related U.S. Application Data

(60) Provisional application No. 60/792,282, filed on Apr. 14, 2006.

(51) Int. Cl.
*H04K 1/00* (2006.01)
(52) U.S. Cl. .................. 375/260; 375/355; 375/357; 375/362; 375/366; 375/364; 370/350; 370/503; 370/509; 370/512; 370/508; 455/502; 455/208; 455/105
(58) Field of Classification Search .............. 375/260, 375/355, 357, 362, 364, 366; 370/350, 503, 370/509, 508, 512–515; 455/502, 208, 105
See application file for complete search history.

(56) References Cited

U.S. PATENT DOCUMENTS

| 2004/0005022 | A1 | 1/2004 | Zhu et al. |
| 2004/0082356 | A1 | 4/2004 | Walton et al. |
| 2005/0233752 | A1 | 10/2005 | Laroia et al. |
| 2006/0083267 | A1* | 4/2006 | Laroia et al. ................ 370/503 |

FOREIGN PATENT DOCUMENTS

WO  2006044661  4/2006

OTHER PUBLICATIONS

International Search Report—PCT/US07/066674, International Search Authority—European Patent Office—Oct. 5, 2007.

* cited by examiner

*Primary Examiner*—David C Payne
*Assistant Examiner*—Rahel Guarino
(74) *Attorney, Agent, or Firm*—Milan I. Patel

(57) ABSTRACT

A composite signal includes a high power beacon signal and low power corresponding wideband synchronization signal and is communicated over a time interval exceeding a single OFDM transmission time interval. A base station transmits one or more different such composite broadcast signals in a recurring timing structure. Each different potential beacon signal, e.g., a single tone signal, is paired with a unique wideband synchronization signal. A wideband synchronization signal includes at least some predetermined null tones and at least some predetermined non-null tones. For a given wideband synchronization signal, the predetermined null tones carry predetermined modulation symbol values, A wireless terminal receives a composite signal, identifies a beacon, determines a corresponding known wideband synchronization signal, compares received to known wideband synchronization signals, and determines at least one of a timing adjustment, frequency adjustment and channel estimation.

14 Claims, 24 Drawing Sheets

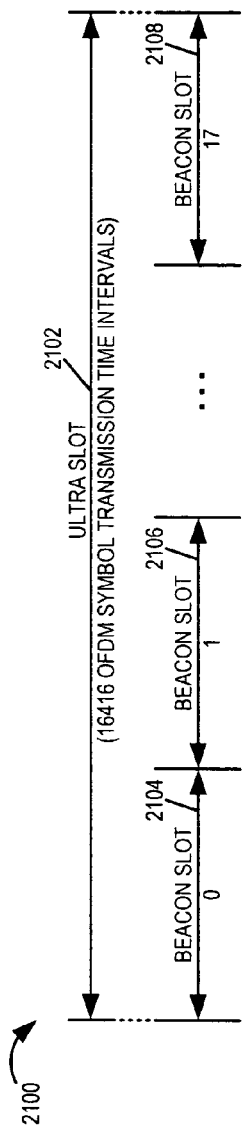
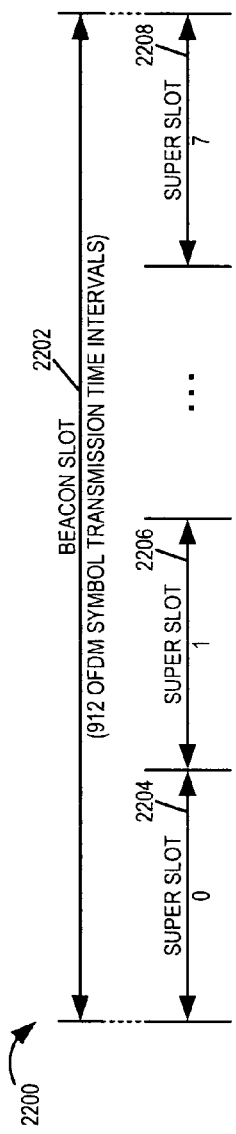
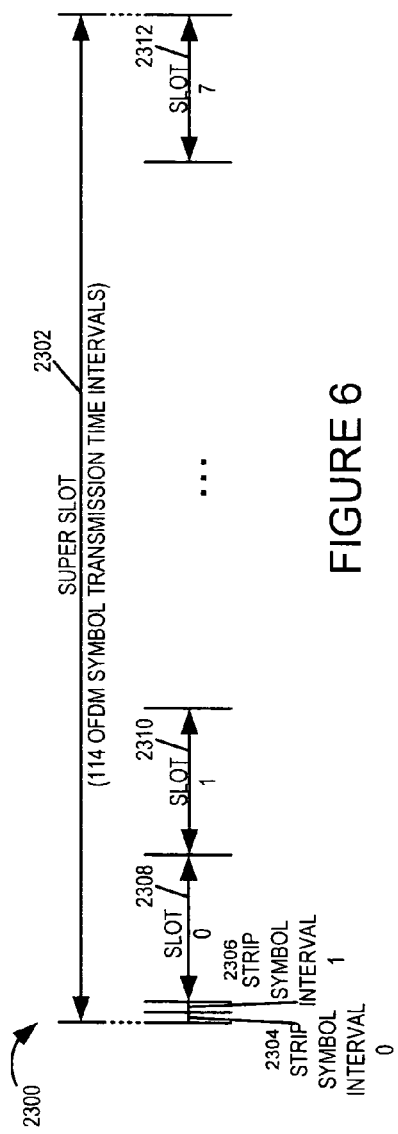
FIGURE 4
FIGURE 5
FIGURE 6

4200

4202  4204

| INDEX OF BEACON TONE | WIDEBAND TIMING SYNC. SIGNAL TONE MASK |
|---|---|
| 4 | 0011010010100110111110010011011011001101101101000110001010011001101010100100001011101110011110001000010000100 |
| 7 | 01100000010001101011101000001101111000011101100010101110011001110001010011110000010001110010100110001101101010011 |
| 10 | 1000010000010111001100110100100101100000101010001101111101100001111100010110010000111110101110010111011101010001010 |
| 13 | 00010000101001100110011001011101001000100101111010000110101100101110111011001100011111101100011000001001000110111 |
| 16 | 11001110010000100011000011111001100111110000110011100110111101111000010000010010001010010101110100011011101010101 |
| 19 | 111000011010000101001100100110101010111011010000011100011100001111100110011100010101110110011001010001100011010001 |
| 22 | 1001101000001100000111010111110001111100000111001110001010011101001101100010001100011101001000101101111010010 |
| 25 | 0010011000100001011100011000010101010110010000110110100111001010101010011011001100011100001111011011010011001011 |
| 28 | 0010010000010000100111010000000101110011101101110111101111000101110100110011000111110011010100100001110110100100011100 |

| INDEX OF BEACON TONE | WIDEBAND TIMING SYNC. SINGAL TONE MASK |
|---|---|
| 85 | 1000110101110001001011110111000011100100<br>110011110011100101111010000100001110001000011001011001011100101000110101000 |
| 88 | 1000101100100101010001110001110100010011101001111010101011010011100001010011101100001110000101101100001101010011 |
| 91 | 1001011010111001001000100110110111011010100111011101000101010110101100010100100101000011001011001100011011000100 |
| 94 | 00110111011110110001100110110101101110001001100100110110010100110100101000010011010100110000101010001010101101 |
| 97 | 010011110110101010110100010111101100011010101101110101101100110101010000101111000110000011010100000010000011110 |
| 100 | 1010011001000010001111010101010001101000101000010000101101101101101010101011011010010111101000011110101001110011100010 |
| 103 | 110011010000110100111100011000111000010100011001000100101111000101100001110010111011011101001101011011010010001001 |
| 106 | 100010010111100101000010000100001000011110111101011001110011100100001011110110010101000110001110010011110110001110011101 |
| 109 | 00001011011110101001110101000011000110101110100100001001110000100101110011001101100111011010111010010010001001010010 |

FIGURE 15C

| INDEX OF BEACON TONE ← 4302 | WIDEBAND TIMING SYNC. SIGNAL NON-NULL TONE SET MODULATION VALUE INFO 1= (-1,0); 0 = (1,0) ← 4304 |
|---|---|
| 4 | 00011011001111001010111111011111110010 1010011011101101 |
| 7 | 01000011010001011001111011000110010100 1011100101010100 |
| 10 | 010001011110101001111101101011110110100 1011101000110110 |
| 13 | 100001110000100011111101010000100011101 1010100001110101 |
| 16 | 011110001010000101001101110111011101010 1110100101110101 |
| 19 | 000111111001001101101010000100101010111 0000110000011011 |
| 22 | 000011100100010001100101110110010100110 1100010001011011 |
| 25 | 001111011101100110110011100111100000001 0100011111110111 |
| 28 | 110101100110110111110001000011000000100 1000101011010011 |
| 31 | 101100111011111100000110010001110001111 1000111100111011 |
| 34 | 001101110111111111100101111010011101101 11101100100101110 |
| 37 | 110100000100000110011011001010000101111 0011001011100011 |
| 40 | 111010110011100011001111100100110111000 1101110111110000 |
| 43 | 011011101100101010110010010000010001100 0001101111000100 |
| 46 | 011110111110000100010011110101101100011 1000011100101100 |
| 49 | 111010101000101001000111111111111101110001 1100100101100110 |
| 52 | 011111010110010111111111100100001100111 0011011010010010 |
| 55 | 010011011111000010000110010001001110011 0111101000010010 |
| 58 | 011110011111100110000111111101000100001 1101110100101011 |
| 61 | 001011100011001101100001001111111001100 1111001000011010 |
| 64 | 000110001010101011011001111000001011110 1000010100010011 |
| 67 | 111111111111001000011100011110100111011 0111000010010101 |
| 70 | 101010111010010000110000010000101111111 1000111001111000 |

FIGURE 16A

| INDEX OF BEACON TONE 4302 | WIDEBAND TIMING SYNC. SIGNAL NON-NULL TONE SET MODULATION VALUE INFO 1= (-1,0); 0 = (1,0) 4304 |
|---|---|
| 73 | 01000010011010000010001110101100011010100111100101110 01 |
| 76 | 10101010100001010110011001001110011011000000001011001 11 |
| 79 | 110100011110001010110111001100010001000110000110111110 1 |
| 82 | 00111111110110100111111011010000101101111001110101111 1 |
| 85 | 00001100111011111111101111000101011111100111101110 11 |
| 88 | 11000101100100110001010110111010101100111100001001 0111 |
| 91 | 11100111111111011101101101100001010001011110101011 10011 |
| 94 | 1000010010011000011111101011110010000111110011111110 111 |
| 97 | 1111110001001001101010001100101000101010101011010010 000 |
| 100 | 10101110111110011100011001011001010000001111001100111 00 |
| 103 | 001000111101000000011111110101100011000000000011111 10101 |
| 106 | 0100111011101110100101010000000010000110011111110010 100 |
| 109 | 0111001110110010101001101101000110101011000100000110 100 |

FIGURE 16B

| FIGURE 16A |
|---|
| FIGURE 16B |

FIGURE 16

METHODS AND APPARATUS RELATED TO COMPOSITE BEACON AND WIDEBAND SYNCHRONIZATION SIGNALING

RELATED APPLICATIONS

The present application claims the benefit of the filing date of U.S. Provisional Patent Application Ser. No. 60/792,282, filed on Apr. 14, 2006 titled "METHODS AND APPARATUS RELATED TO COMPOSITE BEACON AND WIDEBAND SYNCHRONIZATION SIGNALING".

FIELD OF THE INVENTION

The present invention relates to wireless communications systems, and more particularly to methods and apparatus which use beacon and wideband synchronization signaling.

BACKGROUND

In wireless communication systems as a wireless terminal moves throughout the system channel conditions vary as a function of a number of variables such as distance from a base station attachment point, obstructions, terrain, interference levels, etc. At some point it may be necessary for a wireless terminal to undergo a handoff operation from one base station attachment point to another. It would be desirable if such a wireless terminal could, on an ongoing basis, quickly evaluate and compare channel estimates between the wireless terminal and alternative attachment points. Methods and apparatus which facilitate such channel estimations without first requiring the wireless terminal to be precisely timing synchronized, e.g., to within a cyclic prefix duration, and/or to be precisely frequency synchronized with respect to each of the attachment points to which it seeks to evaluate channel conditions would also be desirable.

A wireless terminal in an off state which powers up typically needs to establish a connection with a base station attachment point. In instances where a connection may be established at multiple alternative attachment points, it would be desirable if methods and apparatus were available which allow a wireless terminal to quickly compare alternatives and/or quickly establish a channel estimation. Accordingly, there is a need for methods and apparatus capable of addressing one or more of the above discussed needs.

SUMMARY

A base station transmitter transmits composite signals, a composite signal including a beacon signal and a corresponding wideband synchronization signal. A base station attachment point uses a set of downlink tones, and a predetermined subset of the set of downlink tones are used by a base station attachment point to carry beacon signals. In some embodiments, an individual beacon signal uses a single tone at a relatively high per tone transmission power level while the corresponding wideband synchronization signal uses a relatively low average per tone transmission power level for its non-null tones. In various embodiments, the composite signal is greater than an OFDM symbol transmission time interval in duration. For example, in some embodiments, the composite signal is a two OFDM symbol transmission time interval wide signal including a cyclic prefix portion, a body portion, and an extension portion. The format of the composite signal differs in some embodiments to the format of a more conventional OFDM symbol conveying user data which has a duration of a single OFDM symbol transmission time interval and normally includes a cyclic prefix portion and a body portion but not an extension portion.

In one exemplary embodiment, a beacon signal is a single tone signal and each different beacon tone corresponds to a different tone mask identifying a predetermined corresponding set of tones to be used as non-null tones which carry modulation symbol values of a corresponding wideband synchronization signal. In some embodiments, for each different beacon tone, predetermined information also identifies, for each tone of a set of non-null tones of the corresponding wideband synchronization signal, the modulation symbol value to be conveyed. In the corresponding wideband synchronization signal there is also a set of predetermined null tones, which are intentionally left unused to facilitate channel estimation by a wireless terminal receiving the composite signal. In some embodiments, at least ¼ of the tones of the wideband synchronization signal are intentional null tones.

Various, but not necessarily all embodiments, incorporate at least three of the following features: (i) a downlink tone block comprising 101 or more tones, e.g. 113 tones, (ii) a predetermined subset of the downlink tone block tones can be used as beacon tones, said size of the subset being less than half the size of the downlink tone block, e.g., 36 out of the 113 downlink tones can be used as beacon tones, (iii) the potential beacon tones are spaced such that no two potential beacon tones are adjacent, (iv) the potential beacon tones are evenly spaced (v) an individual beacon signal uses one tone out of the subset of potential beacon tones, (vi) a potential beacon signal uses two adjacent tones out of the subset of beacon tones, (vii) a wideband synchronization signal includes predetermined intentional null tones and predetermined non-null tones, at least ¼ of the tones of the wideband synchronization signal being null tones, (viii) a beacon tone carries a modulation symbol value representing a predetermined fixed value transmitted at first transmission power level and each wideband synchronization signal non-null tone carries a modulation symbol value of one of up to four different possible modulation symbol values transmitted at a second power level, said second power level being lower than said first power level, and (ix) the first power level corresponds to the highest per tone energy level used by the base station attachment point transmitter in the tone block.

In various embodiments, a base station transmitter transmits a first composite signal including a first beacon signal and a corresponding first wideband synchronization signal at a first point in a recurring timing structure and transmits a second composite signal including a second beacon signal and a second corresponding wideband synchronization signal at a second point in the recurring timing structure, said first and second points in time being different and at least one tone in said first beacon signal being different than at least one tone in said second beacon signal.

In some embodiments each different beacon signal is paired with a known wideband synchronization signal, e.g., a unique known wideband synchronization signal. A wireless terminal receives a composite signal, identifies the beacon signal and then determines a corresponding known wideband synchronization signal. The wireless terminal compares, e.g., correlates, the received wideband synchronization signal to the determined known wideband synchronization signal. The wireless terminal uses wideband synchronization signal comparison information to determine at least one of: a receiver timing adjustment, a receiver frequency adjustment, and a channel estimation.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIGS. 4-8 illustrate an exemplary orthogonal frequency division multiplexing (OFDM) downlink timing structure in accordance with various embodiments.

FIG. 16 comprising the combination of FIG. 16A and FIG. 16B is a table associating each of 36 potential beacon tones with a corresponding set of 55 modulation symbol values to be used by the non-null wideband synchronization tones in an exemplary embodiment.

DETAILED DESCRIPTION

Figure 1:
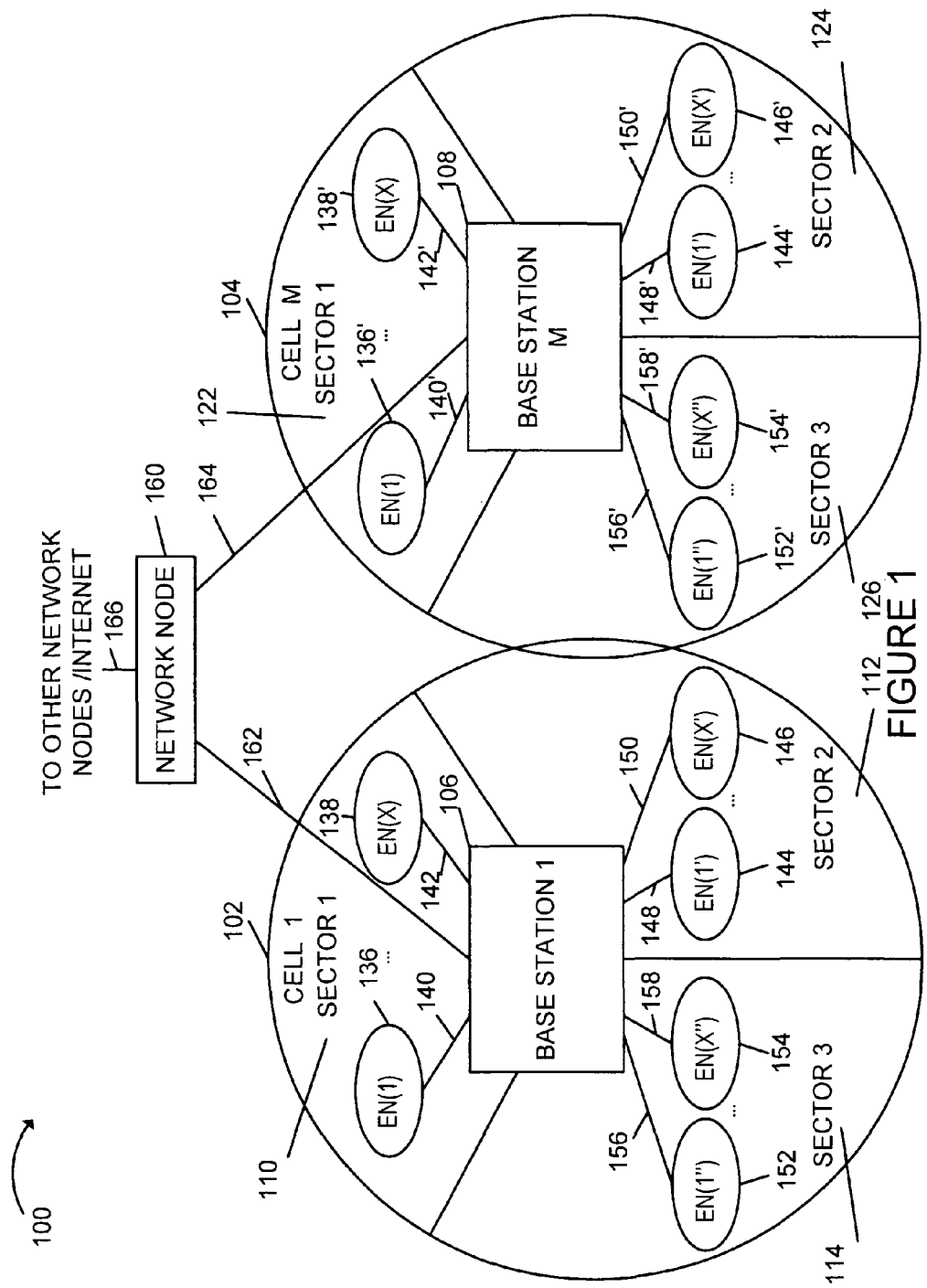
FIG. 1 is a drawing of an exemplary communications system implemented in accordance with various embodiments.

FIG. 1 shows an exemplary communication system 100 implemented in accordance with various embodiments including multiple cells: cell 1 102, cell M 104. Exemplary system 100 is, e.g., an exemplary OFDM spread spectrum wireless communications system such as a multiple access OFDM system. Each cell 102, 104 of exemplary system 100 includes three sectors. Cells which have not be subdivided into multiple sectors (N=1), cells with two sectors (N=2) and cells with more than 3 sectors (N>3) are also possible in accordance with various embodiments. Each sector supports one or more carriers and/or downlink tones blocks. In some embodiments at least some of the sectors support three downlink tones blocks. In various embodiments at least some of the downlink tone blocks have a corresponding uplink tone block. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of end nodes (ENs) in each sector 110, 112, 114. Sector 1 110 includes EN(1) 136 and EN(X) 138 coupled to BS 106 via wireless links 140, 142, respectively; sector 2 112 includes EN(1') 144 and EN(X') 146 coupled to BS 106 via wireless links 148, 150, respectively; sector 3 114 includes EN(1") 152 and EN(X") 154 coupled to BS 106 via wireless links 156, 158, respectively. Similarly, cell M 104 includes base station M 108, and a plurality of end nodes (ENs) in each sector 122, 124, 126. Sector 1 122 includes EN(1) 136' and EN(X) 138' coupled to BS M 108 via wireless links 140', 142', respectively; sector 2 124 includes EN(1') 144' and EN(X') 146' coupled to BS M 108 via wireless links 148', 150', respectively; sector 3 126 includes EN(1") 152' and EN(X") 154' coupled to BS 108 via wireless links 156', 158', respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each end node, e.g. EN 1 136, may be a wireless terminal including a transmitter as well as a receiver. The wireless terminals, e.g., EN(1) 136 may move through system 100 and may communicate via wireless links with the base station in the cell in which the EN is currently located. The wireless terminals, (WTs), e.g. EN(1) 136, may communicate with peer nodes, e.g., other WTs in system 100 or outside system 100 via a base station, e.g. BS 106, and/or network node 160. WTs, e.g., EN(1) 136 may be mobile communications devices such as cell phones, personal data assistants with wireless modems, etc.

Each base station (106, 108) performs downlink signaling, e.g., transmitting multi-symbol duration composite signals, a composite signal including a beacon signal and a corresponding wideband synchronization signal, said composite signal including an initial OFDM symbol and an extension OFDM symbol, in accordance with a downlink timing and frequency structure. Downlink signaling also includes transmitting OFDM symbols conveying user data in accordance with a downlink timing and frequency structure. The different base station sector transmitters are not necessarily timing synchronized. For example, in some embodiments, sector transmitters of the same base station are timing synchronized, but sector transmitters from different base stations are not timing synchronized. The multi-symbol beacon/wideband synchronization composite signals, are generated and transmitted to facilitate easy detection and measurement by a wireless terminal which may or may not be precisely, e.g., to within a cyclic prefix duration, timing synchronized with respect to the attachment point from which the composite signal is transmitted. In accordance with various embodiments, the base station beacon/timing synchronization composite signaling facilitates the comparison of beacon signals and/or channel estimates corresponding to a plurality of different base station sector attachment points.

Figure 2:
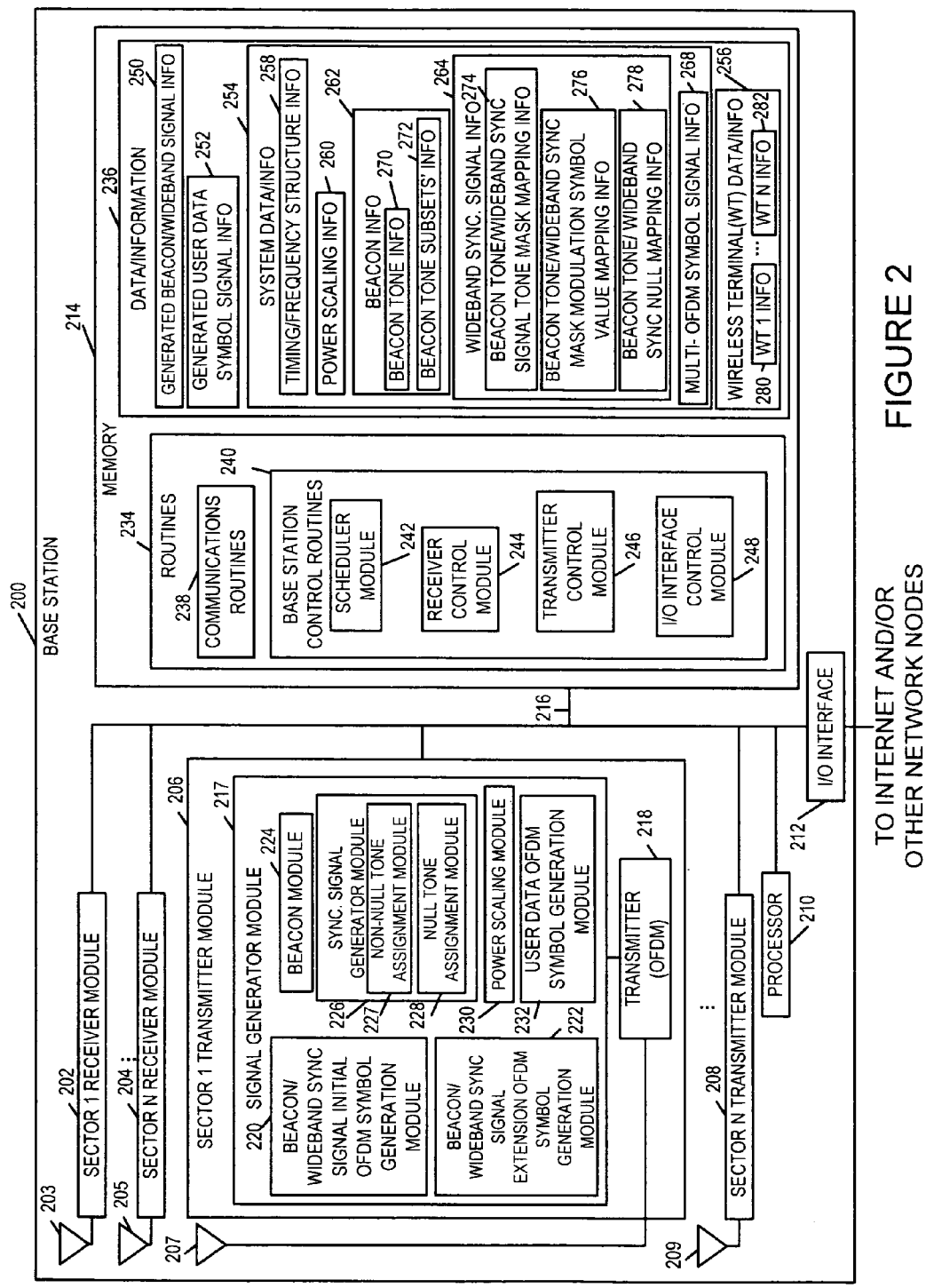
FIG. 2 is a drawing of an exemplary base station implemented in accordance with various embodiments.

FIG. 2 is a drawing of an exemplary base station 200, implemented in accordance with various embodiments. Exemplary base station 200 may be any of the base stations (106, 108) of exemplary system 100 of FIG. 1. Exemplary base station 200 includes a plurality of sector receiver modules (sector 1 receiver module 202, . . . , sector N receiver module 204), a plurality of sector transmitter modules (sector 1 transmitter module 206, . . . , sector N transmitter module 208), a processor 210, an I/O interface 212, and memory 214 coupled together via a bus 216 via which the various elements can interchange data and information. In some embodiments, the number of sector transmitter modules, N, is such that N=2, 3, or more than three.

In some embodiments, the base station corresponds to a single sector and the base station includes at most one sector transmitter module and one sector receiver module. In some such embodiments, the base station is co-located with other one sector base stations, the composite of a plurality of such base stations providing the coverage for a single cell. In some other such embodiments, the single sector base station corresponds to a cell, with the one single sector base station providing the full coverage for the entire cell area.

Sector 1 receiver module 202 is coupled to sector 1 receive antenna 203 via which the base station 200 receives uplink signals from wireless terminals using a base station 200 sector 1 physical attachment point as their point of attachment. Sector N receiver module 204 is coupled to sector N receive antenna 205 via which the base station receives uplink signals from wireless terminals using a base station 200 sector N physical attachment point as their point of attachment.

Sector 1 transmitter module 206 is coupled to sector 1 transmit antenna 207 via which the base station 200 transmits downlink signals to wireless terminals. Sector N transmitter module 208 is coupled to sector N transmit antenna 209 via which the base station 200 transmits downlink signals to wireless terminals. For example, in some embodiments, sector 1 transmitter module 206 transmits downlink signals including: (i) multi-symbol OFDM beacon/wideband synchronization composite signals including an initial symbol portion and an extension symbol portion and (ii) downlink user data OFDM symbols including user data, control data and/or pilot signals.

In some embodiments for a given sector, the same antenna is used for a sector transmitter module and a sector receiver module. In some embodiments, for a given sector, the base station sector provides connectivity corresponding to multiple physical attachment points, e.g., corresponding to a plurality, e.g., three, of downlink tones blocks and/or downlink carriers. In some embodiments, for a downlink tone block there is a corresponding uplink tone block.

Sector 1 transmitter module 206 includes a signal generator module 217 and an OFDM transmitter 218 coupled together. The signal generator module 217 generates signals including: multi-OFDM symbol duration composite signals, a composite signal including a beacon tone signal and a wideband synchronization signal including at least some intentional NULL tones and (ii) single OFDM symbol signals including user data, control data and/or pilot signals. The signal generator module 217 includes a beacon/wideband synchronization signal initial OFDM symbol generation module 220, a beacon/wideband synchronization signal extension OFDM symbol generation module 222, a beacon module 224, a synchronization signal generator module 226 including a non-null tone assignment module 227 and a null tone assignment module 228 and, a power scaling module 230, and a user data OFDM symbol generation module 232. The beacon/wideband synchronization signal initial symbol generation module 220 generates the initial OFDM symbol in a multi-symbol composite signal, the initial OFDM symbol including a cyclic prefix portion and a body portion, the body portion immediately following the cyclic prefix portion. The beacon/wideband synchronization signal initial symbol generation module 220 includes a cyclic prefix generation module. The cyclic prefix generation module generates the cyclic prefix portion by copying an end portion of the body portion. The beacon/wideband synchronization signal extension symbol generation module 222 generates a symbol extension portion, e.g., a symbol extension OFDM symbol, that immediately follows the initial symbol in the multi-symbol composite signal. The generated symbol extension portion includes a first copy of the body portion beginning from the start of the symbol extension portion.

Beacon module 224 identifies the beacon tone for a give multi-symbol composite signal in the downlink frequency/timing structure corresponding to the base station sector 1 transmitter module at a given point in time with respect to the timing structure. Power scaling module 230 places more energy on the identified beacon tone than on any other tone in the composite signal. In some embodiments, the energy placed on the single beacon tone is at least 3 dB higher than the energy placed on any other tone include in the composite signal.

The synchronization signal generator module 226, which includes a non-null tone assignment module 227 and a null tone assignment module 228, is used to include a plurality of tones corresponding to a wideband synchronization signal in the composite signal. The non-null tone assignment module 227 controls the transmitter 218 to place predetermined modulation symbol values at predetermined energy levels on a predetermined plurality of tones for a specific wideband synchronization signal of the composite signal being generated. The null tone assignment module 228 controls the transmitter 218 not to place energy on a predetermined plurality of NULL tones for a specific wideband synchronization signal of the composite signal being generated. The specific wideband signal being generated has been matched to correspond to a specific beacon tone signal. The intentional NULL tones in conjunction with the non-null tones of the wideband synchronization signal facilitate measurements by wireless terminals, e.g., for timing adjustment, frequency adjustment and/or channel estimation.

In some embodiments, the initial OFDM symbol of the composite signal includes a full set of downlink tones transmitted by the base transmitter module 206 during the period of the initial OFDM symbol. For example for an exemplary 1.25 MHz OFDM embodiment the full set of downlink tones is a set of 113 tones and the initial OFDM symbol includes one high power beacon tone, a plurality of low power wideband synchronization signal non-null tones, e.g., 55 tones, and a plurality of wideband synchronization signal null tones, e.g., 57 NULL tones.

User data symbol generation module 232 generates OFDM user data symbols including user data, control data and/or pilot signals. For example, immediately following the multi-symbol composite signal, user data symbol generation module 232 may generate a sequence of user data OFDM symbols, e.g. 112 user data OFDM symbols. For example, the multi-symbol signal may correspond to the first two OFDM symbols, e.g., strip symbols, in a superslot of 114 successive OFDM symbols and the 112 user data OFDM symbols may be the OFDM symbols of the eight slots of the same superslot. Each user data symbol includes a user data cyclic prefix portion and a user data body portion. The user data body portion includes at least some user data, provided the base station has at least some downlink user data to transmit at that time. For example, an exemplary OFDM user data symbol includes modulation symbol values corresponding to four different traffic channel segments, each conveying modulation symbol values used to convey coded user data information bits. The different channel segments of a given OFDM user data symbol may be associated with different transmission power levels. In some embodiments each of the OFDM user data symbols is controlled, e.g., by the power scaling module 230 to be transmitted at a per tone power level which is at least 3 dB lower than the highest per tone power level of a tone in an initial symbol of a multi-symbol composite signal conveying the beacon signal. In some embodiments, some, all, or portions of the signal generation module 217 are included in routines 234. Transmitter 218 is a multi-tone OFDM transmitter which transmits signals generated by the signal generation module 217.

I/O interface 212 couples the base station 200 to the Internet and/or other network nodes, e.g., routers, other base stations, AAA nodes, central control nodes, Home Agent nodes, etc. Thus I/O interface 212 provides a network interface for wireless terminals using a base station 200 physical attachment point, facilitating communications sessions between WTs in different cells.

Memory 214 includes routines 234 and data/information 236. The processor 210, e.g., a CPU, executes the routines 234 and uses the data/information 236 in memory 214 to control the operation of the base station 200 and implement methods. Routines 234 include communications routines 238 and base station control routines 240. The communications routines 238 implement the various communications protocols used by the base station 200. The base station control routines 240 include a scheduler module 242, a receiver control module 244, a transmitter control module 246, and an I/O interface control module 248. The scheduler module 242, e.g., a scheduler, schedules air link resources, e.g., assigning uplink and downlink segments including traffic channel segments to wireless terminals using a base station 200 attachment point.

Receiver control module 244 controls the operation of the sector receiver modules (202, 204). Transmitter control module 246 controls the operation of the sector transmitter modules (206, 208). I/O interface control module 248 controls the operation of I/O interface 212.

Data/information 236 includes generated beacon/wideband synchronization multi-symbol composite signal information 250, generated user data symbol signal information 252, system data/information 254 and wireless terminal data information 256. System data/information 254 includes timing/frequency structure information 258, power scaling information 260, beacon information 262, wideband synchronization signal information 264, and multi-OFDM symbol composite signal information 268. WT data/information 256 includes a plurality of sets of WT data/information (WT 1 data/information 280, . . . , WTN data/information 282), each set of WT data information corresponding to a WT using a base station 200 attachment point.

Generated beacon/wideband synchronization multi-symbol composite signal information 250 includes information pertaining to generated multi-symbol beacon/wideband synchronization composite signals, e.g., information representing the generated signal and/or portions of the generated signal, e.g., information representing the cyclic prefix portion, the body portion and the extension portion.

Generated user data symbol signal information 252 includes information pertaining to a generated user data symbol. For example, information 252 includes information representing a cyclic prefix portion and information representing a body portion.

Timing/frequency structure information 258 includes downlink and uplink timing and frequency structure information. Downlink timing and frequency structure information includes information identifying: blocks of downlink tones used by each base station sector transmitter module, numbers of downlink tones used, channel segment structure, tone hopping information, repetitive timing structure used by each base station sector transmitter module, e.g., identifying when in the timing structure a multi-symbol OFDM beacon/wideband synchronization composite signal should be transmitted and when an OFDM user data symbol should be transmitted. In some embodiments, the same base station attachment point transmitter transmits a plurality of different beacon/wideband synchronization composite signals at different times in a recurring downlink structure as indicated in information 258. Power scaling information 260 includes information identifying power levels associated with beacon signals, non-null tone wideband synchronization signal tones, user data signals, control data signals, and pilot tone signals. Beacon information 262 includes beacon tone information 270 and beacon tone subsets information 272. Beacon tone information 270 includes information identifying which tones in the downlink tones blocks are to be used as beacon tones by which sector transmitter modules at designated locations in the repetitive downlink timing structure, and information identifying the modulation signal value to be conveyed for the beacon tone. Beacon tone subsets' information 272 includes information identifying subsets of potential beacon tones, e.g., a downlink tone block of 113 tones includes 36 beacon tones sub-divided into 3 subsets of 12 tones each. Wideband synchronization signal information 264 includes information identifying which tones in the downlink tones blocks are to be used as non-null wideband synchronization signal tones by which sector transmitter modules at designated locations in the downlink timing structure, and information identifying the modulation signal value to be conveyed for each of the non-null wideband synchronization signal tones. Multi-symbol signal information 268 includes information used in generating the multi-symbol composite signals, e.g., information identifying the duration of the cyclic prefix portion, the duration of the body portion, information including formulas used for generating the extension portion. Wideband synchronization signal information 264 includes beacon tone/wideband synchronization signal tone mask mapping information 274, e.g., information of FIG. 15, beacon tone/wideband synchronization mask modulation symbol value mapping information 276, e.g., information of FIG. 16, and beacon tone/wideband synchronization signal null tone mapping information 278. In some embodiments, the null tones of a wideband synchronization signal in a composite signal are by default the tones of the downlink tone block not designated as the beacon tone or tones and not designated as the non-null tones of the wideband synchronization signal. In some embodiments, the tones of the composite signal include a beacon signal tone or tones, non-null wideband synchronization signal tones, and null wideband synchronization signal tones, but do not include the full set of tones of the downlink tone block, e.g., with some other tones being used to communicate control information.

Each set of WT data information (280, 282) includes user data, identification information, and user/device/session/resource information. The user data includes, e.g., voice data, audio data, image data, text data, file data, etc., to be transmitted and/or received by the wireless terminal in a communications session with a peer node. The user data includes downlink user data to be transmitted to the WT via downlink traffic channel segments assigned to the WT using OFDM user data symbols. Identification information includes information identifying the attachment point sector and/or tone block associated with the WT connection, WT identifiers, addresses, and base station assigned user identifiers such as an active user identifier. User device/session/resource information includes information pertaining to device control parameters, peer node information, address information, session establishment and maintenance information, and air link resource information, e.g., uplink and/or downlink segments assigned to the WT.

Figure 3:
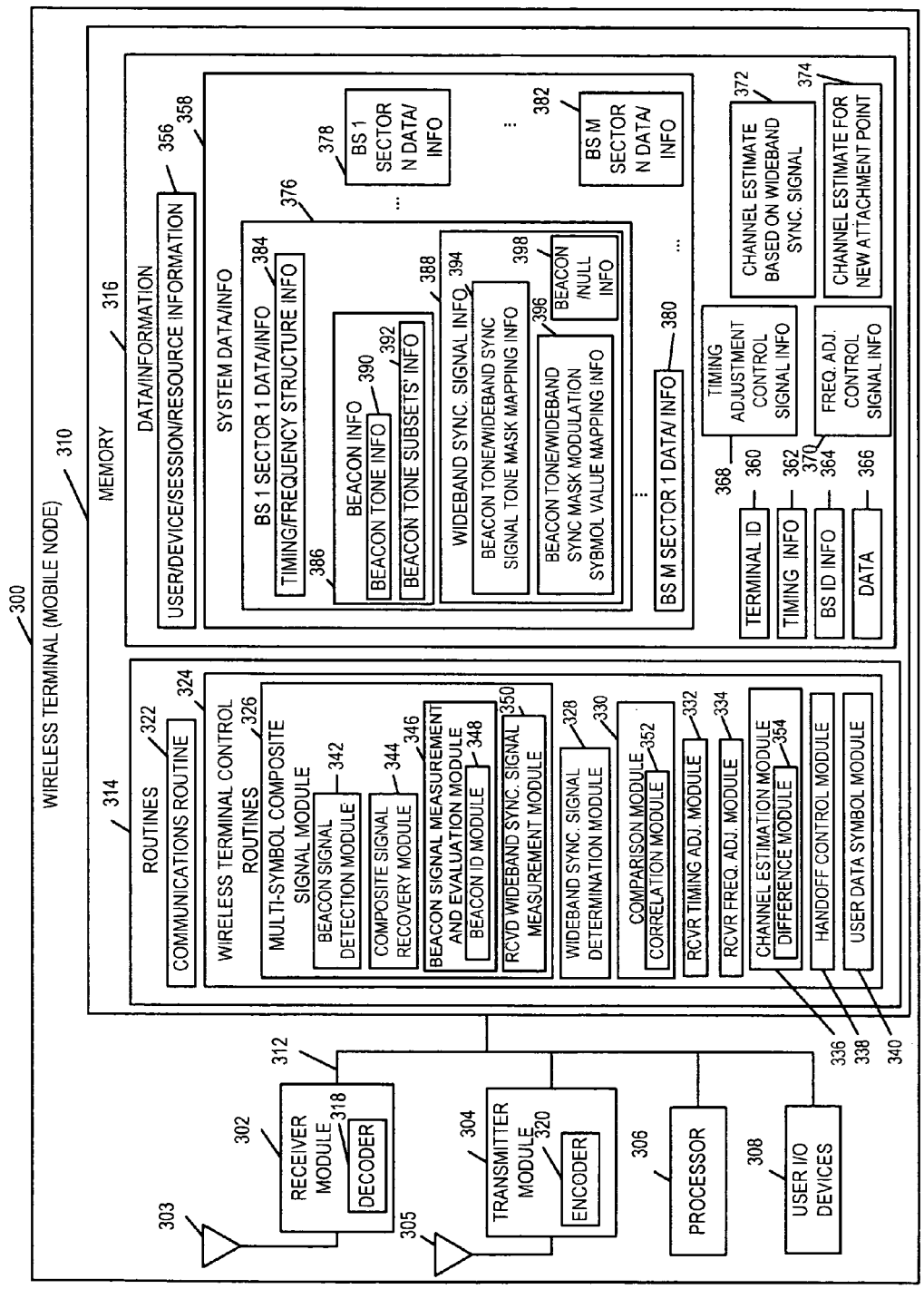
FIG. 3 is a drawing of an exemplary wireless terminal, e.g., mobile node, implemented in accordance with various embodiments.

FIG. 3 illustrates an exemplary wireless terminal 300, e.g., mobile node, implemented in accordance with various embodiments. Exemplary wireless terminal 300 may be any of the exemplary wireless terminals of exemplary system 100 of FIG. 1, e.g., ENs 136, 138, 144, 146, 152, 154, 136', 138', 144', 146', 152', 154'. The exemplary wireless terminal 300 includes a receiver module 302, a transmitter module 304, a processor 306, user I/O devices 308, and a memory 310 coupled together via a bus 312 over which the various elements can interchange data and information.

The wireless terminal 300 includes receiver and transmitter antennas 303, 305 which are coupled to receiver and transmitter modules 302, 304 respectively. The wireless terminal receiver module 302 receives downlink signals including: (i) multi-symbol OFDM beacon/wideband synchronization composite signals including an initial OFDM symbol and an extension OFDM symbol and (ii) user data OFDM symbols including user data, control data, and/or pilot signals via antenna 303. The WT transmitter 304 transmits uplink signals to base stations, e.g., including access signals, handoff signals, control signals, and user data signals. In some embodiments a single antenna is used for receiver and transmitter, e.g., in combination with a duplex module. The receiver module 302 includes a decoder 318, while the transmitter module 304 includes an encoder 320. User I/O devices 308, e.g., microphone, keypad, keyboard, camera, mouse, switches, speaker, display, etc., allow the user of WT 300 to input user data, output user data, control applications, and control at least some operations of the wireless terminal, e.g., initiate a communications session.

Memory 310 includes routines 314 and data/information 316. Processor 306, e.g., a CPU, under control of one or more routines 314 stored in memory 310 uses the data/information 316 to cause the wireless terminal 300 to operate and to control implementation of steps of methods. In order to control wireless terminal operation, routines 314 includes communications routine 322, and wireless terminal control routines 324. The communications routine 322 implements various communications protocols used by the wireless terminal 300.

Figure 14:
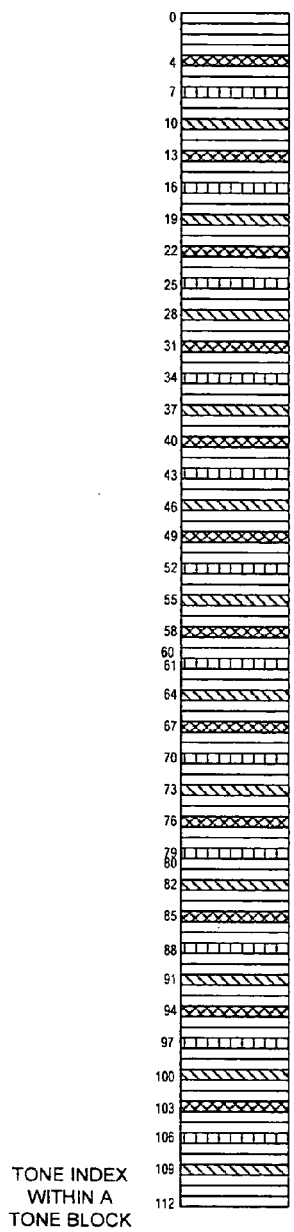
FIG. 14 illustrates features of beacon signaling used in some embodiments.
Figure 14:
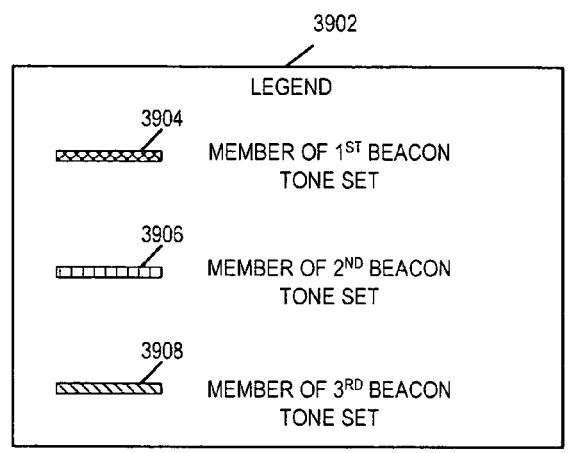

Wireless terminal control routines 324 include a multi-symbol composite signal module 326, a wideband synchronization signal determination module 328, a comparison module 330, a receiver timing adjustment module 332, a receiver frequency adjustment module 334, a channel estimation module 336, a handoff control module 338, and a user data symbol module 340. The multi-symbol composite signal module 326 includes a beacon signal detection module 342, a composite signal recovery module 344, a beacon signal measurement and evaluation module 346 which includes a beacon signal identification module 348, and a received wideband synchronization signal measurement module 350. Beacon signal detection module 334 is used for detecting beacon signals, e.g., from a plurality of base station sector transmitters. Beacon signal detection module 334 detects beacons based on the relatively high per tone transmission power level of beacon tone signals. Composite signal recovery module 334 is used to recover composite signals, a composite signal including a beacon signal and a corresponding wideband synchronization signal. Beacon signal measurement and evaluation module 346 measures the energy level and/or strength of the received beacon signals and evaluates beacon signals with respect to other received beacon signals. Beacon signal identification module 348 identifies the beacon signal from among a plurality of potential beacon signals, e.g., based upon the tone or tones of the beacon signal. For example, the beacon information 386 may include information identifying 36 potential single beacon signals, as shown in FIG. 14, and the beacon ID module matches the received beacon tone to one of the 36 potential beacon tones. Received wideband synchronization signal measurement module 350 measures the component of the received composite signal corresponding to the wideband synchronization signal obtaining information characterizing the received wideband synchronization signal.

Wideband synchronization signal determination module 328 uses the beacon identification information from the beacon ID module 348 and wideband synchronization signal information 388 to determine a corresponding known wideband synchronization signal, e.g., the tones of the corresponding known wideband synchronization signal, which tones are null tones, which tones are non-null tones, and the modulation symbol values of the non-null tones. Comparison module 330 compares a received wideband synchronization signal, represented by information output from module 350 to a determined known wideband synchronization signal, represented by information output from module 328. Comparison module 330 includes correlation module 352 which performs a correlation operation.

Received timing adjustment module 332 uses information including the results of the comparison module 330 to determine timing adjustment control signal information 368 and control timing adjustments of receiver 302. Received frequency adjustment module 334 uses information including at least one of the results of the comparison module 330 and results from the beacon signal measurement and evaluation module 346 to determine frequency adjustment control signal information 370 and control frequency adjustments of receiver 302.

Channel estimation module 326 generates a channel estimate using both the received wideband synchronization signal information from module 350 and the determined known wideband synchronization signal information from module 328. Channel estimation module 326 includes difference determination module 354 which determines a difference between the determined known wideband synchronization signal and the received wideband synchronization signal.

Handoff control module 338 is used for changing attachment points, e.g., from one base station sector associated with a tone block to another base station sector associated with a tone block, and the handoff control module 338 controls the adjustment of transmitter 304 timing and/or frequency at the appropriate time in the handoff process using information supplied by the receiver timing adjustment module 332 and/or receiver frequency adjustment module 334. In addition, the handoff control module 338 uses the channel estimate based on wideband synchronization signal information corresponding to the new attachment point to initialize another channel estimate 374 that is to be used when attaching to the point from which the wideband synchronization signal used to generate the channel estimate was transmitted.

User data symbol module 332 processes received user data OFDM symbols, e.g., extracting received user data information and/or pilot signal information. Some of the received OFDM user data symbols recovered include user data directed to the wireless terminal 300 and/or control data relevant to the wireless terminal 300, and the WT 300 recovers such communicated data. For example, a recovered OFDM user data symbol may include a portion of a downlink traffic channel segment assigned to WT 300, and the WT recovers the bits associated with the modulation symbols of the portion of the downlink traffic channel segment.

Data/information 316 includes user/device/session/resource information 356, e.g., user information, device information, WT 300 state information, peer node info, addressing information, routing information, session parameters, air link resource information such as information identifying uplink and downlink channel segments assigned to WT 300. User/device/session/resource information 356 may be accessed and used to implement the methods and/or data structures. Data/information 316 also includes system data/information 358 which includes a plurality of sets of system base station information (BS 1 sector 1 data/information 376, . . . , BS 1 sector N data/information 378, BS M sector 1 data/information 380, . . . , BS M sector N data/information 382). BS 1 sector 1 data/information 376 includes timing/frequency structure information 384, beacon information 386, and wideband synchronization signal information 388. Data/information 316 also includes a terminal ID 360, e.g., a BS assigned wireless terminal identifier, timing information 362, e.g., pertaining to the current point of attachment and also pertaining to other base stations, base station identification information 364, e.g., the ID of the current attachment point and the ID of each BS sector associated with a received beacon signal. Data/information 316 also includes data 366, e.g., user data such as voice data, image data, audio data, text data, file data, etc., received from and to be transmitted to a peer node of WT 300 in a communications session with WT 300. User data includes user data recovered from received OFDM user data symbols corresponding to portions of downlink traffic channel segments assigned to WT 300.

Data/information 316 also includes timing adjustment control signal information 368, frequency adjustment control signal information 370, channel estimate based on wideband synchronization signal 372, and channel estimate for new attachment point 374. Timing adjustment control signal information 368 is an output of the receiver timing adjustment module 332 and is used as an input by the handoff control module 338. Frequency adjustment control signal information 370 is an output of the receiver frequency adjustment module 334 and is used as an input by the handoff control module 338. Channel estimate based on wideband synchronization signal 372 is an output of the channel estimation module 336 and is used as an input to the handoff control module 330, which uses channel estimate 372 to initialization of another channel estimate, channel estimate for new attachment point 374.

Figure 7:
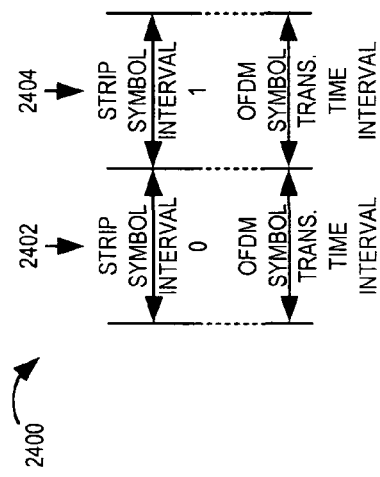
Figure 8:
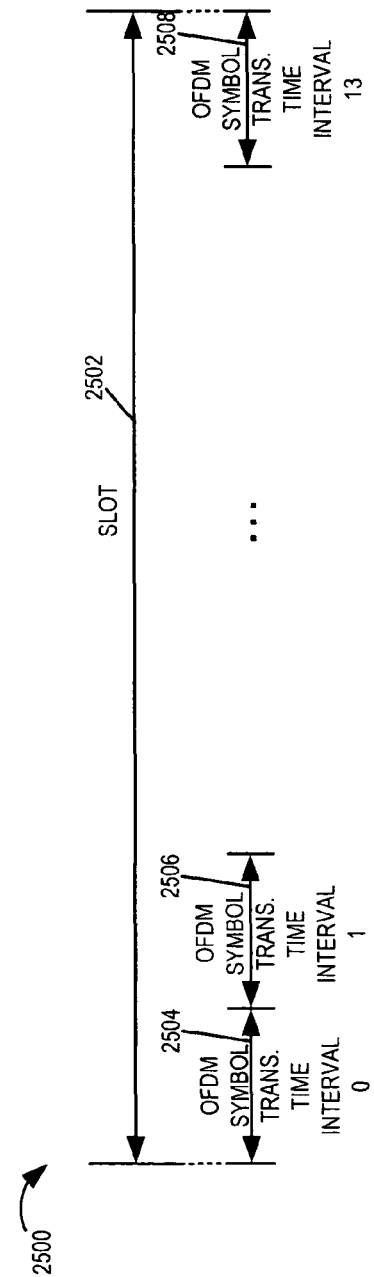

FIGS. 4-8 illustrate an exemplary orthogonal frequency division multiplexing (OFDM) downlink timing structure in accordance with various embodiments. Drawing 2100 of FIG. 4 illustrates an exemplary ultra slot 2102 which has a duration of 16416 OFDM symbol transmission time intervals. Ultra slot 2102 includes 18 beacon slots (beacon slot 0 2104, beacon slot 1 2106, . . . , beacon slot 17 2108). Drawing 2200 of FIG. 5 illustrates an exemplary beacon slot 2202 which has a duration of 912 OFDM symbol transmission time intervals. Beacon slot 2202 may be any of the beacon slots (2104, 2106, . . . , 2108) of FIG. 21. Beacon slot 2202 includes 8 super slots (super slot 0 2204, super slot 1 2206, . . . , super slot 7 2208). Drawing 2300 of FIG. 6 illustrates an exemplary super slot 2302 which has a duration of 114 OFDM symbol transmission time intervals. Super slot 2302 may be any of the super slots (2204, 2206, . . . , 2208) of FIG. 5. Super slot 2302 includes a strip symbol interval 0 2304, a strip symbol interval 1 2306, and 8 slots (slot 0 2308, slot 1 2310, . . . , slot 7 2312). Drawing 2400 of FIG. 7 illustrates that exemplary strip symbol interval 0 2402 and exemplary strip symbol interval 1 2404 each has a duration of an OFDM symbol transmission time interval. Exemplary strip symbol time intervals (2402, 2404) may be the exemplary strip symbol time intervals (2304, 2306) of FIG. 6. Drawing 2500 of FIG. 8 illustrates an exemplary slot 2502 which has a duration of 14 OFDM symbol transmission time intervals. Slot 2502 may be any of the slots (2308, 2310, . . . , 2312) of FIG. 6. Slot 2502 includes 14 successive OFDM symbol transmission time intervals (OFDM symbol transmission time interval 0 2504, OFDM symbol transmission time interval 1 2506, . . . , OFDM symbol transmission time interval 13 2508).

In some embodiments, the strip intervals are used primarily for various broadcast signaling. In various embodiments, at least some of the strip intervals are used to convey composite signals, a composite signal including a beacon signal and a corresponding wideband synchronization signal. In some embodiments, the strip intervals do not convey any downlink user data.

Figure 9:
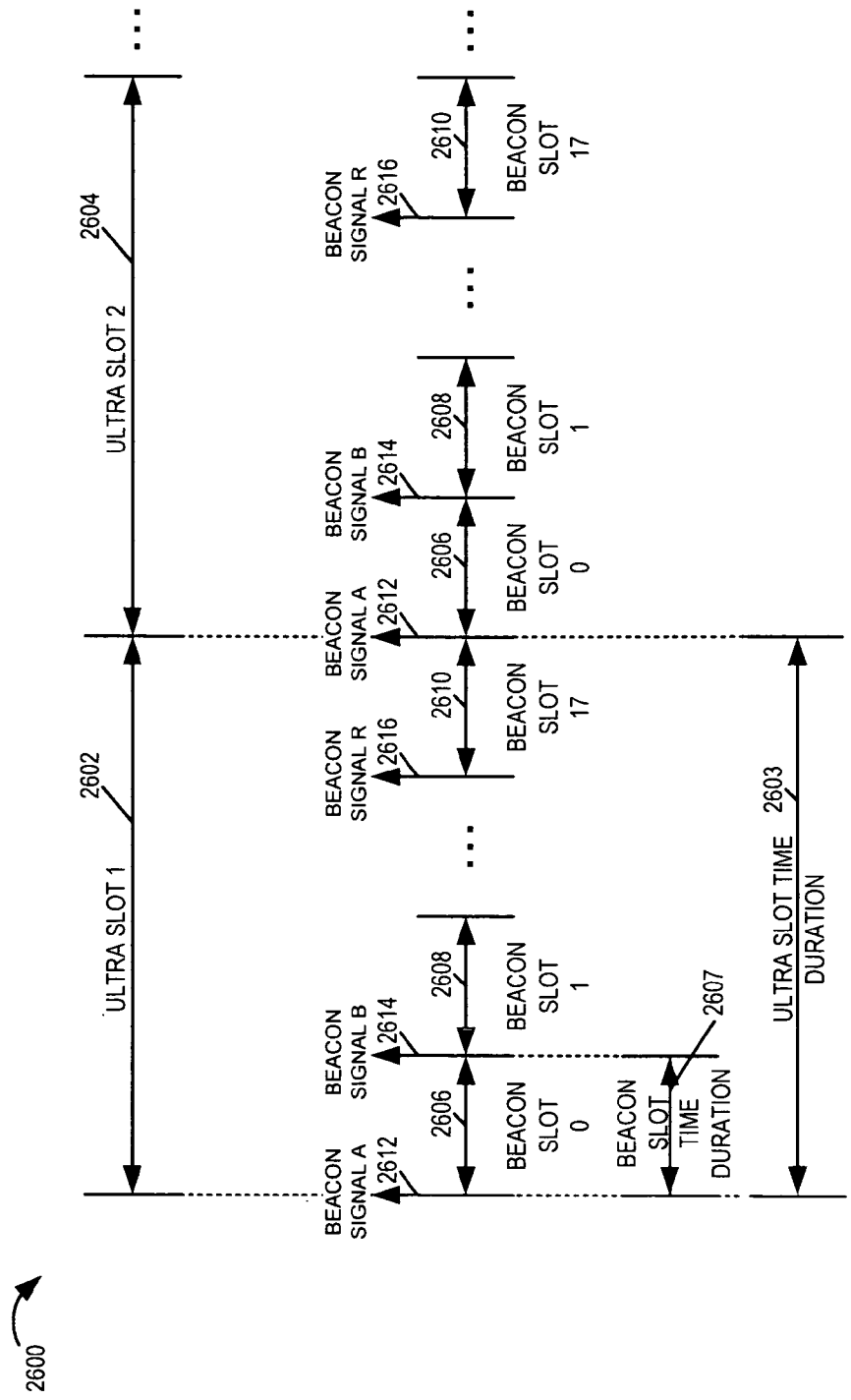
FIG. 9 is a drawing illustrating exemplary beacon signaling from a base station sector, implemented in accordance with various embodiments.

FIG. 9 is a drawing 2600 illustrating exemplary beacon signaling from a base station sector, implemented in accordance with various embodiments. Drawing 2602 illustrates 2 successive ultra slots (ultra slot 1 2602, ultra slot 2 2604), each ultra slot has an ultra slot time duration 2603. Ultra slot 1 2602 includes 18 indexed beacon slots (beacon slot 0 2606, beacon slot 1 2608, . . . , beacon slot 17 2610). Each beacon slot (2606, 2608, . . . , 2610) includes a corresponding beacon signal (beacon signal A 2612, beacon signal B 2614, . . . , beacon signal R 2616), respectively. The pattern of beacon signaling, in this exemplary embodiment, repeats for the first ultra slot 2602 to the second ultra slot 2604. In some other embodiments, the pattern of beacon signaling may repeat on a different time interval, e.g., a superultra slot basis, said superultra slot including multiple ultra slots, or a portion of an ultraslot. The interval between successive beacon signals is a beacon slot time duration 2607. In this example, a beacon signal is transmitted during the two strip intervals in the first super slot of each beacon slot.

Figure 10:
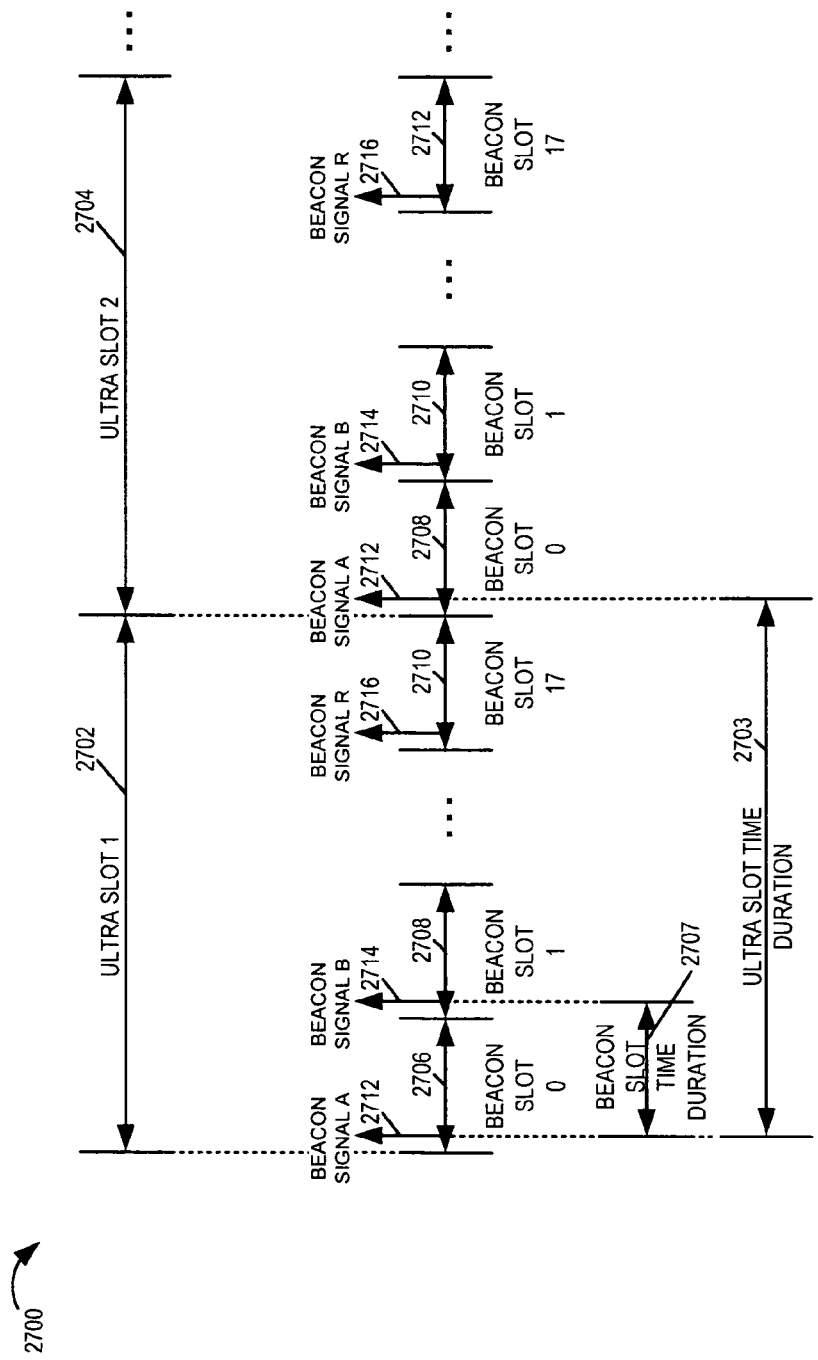
FIG. 10 is a drawing illustrating exemplary beacon signaling from a base station sector, implemented in accordance with various embodiments.

FIG. 10 is a drawing 2700 illustrating exemplary beacon signaling from a base station sector, implemented in accordance with various embodiments. Drawing 2702 illustrates 2 successive ultra slots (ultra slot 1 2702, ultra slot 2 2704). Ultra slot 1 2702 includes 18 indexed beacon slots (beacon slot 0 2706, beacon slot 1 2708, . . . , beacon slot 17 2710). Each beacon slot (2706, 2708, . . . , 2710) includes a corresponding beacon signal (beacon signal A 2712, beacon signal B 2714, . . . , beacon signal R 2716), respectively. The pattern of beacon signaling repeats, in this exemplary embodiment, for the first ultra slot 2702 to the second ultra slot 2704. The interval between successive beacon signals is a beacon slot time duration 2707. The interval between the first beacon signal of ultra slot 1 2702 and first beacon signal of ultra slot 2 2704 is an ultra slot time duration 2703. In this example, a beacon signal is transmitted during the two strip intervals in the second super slot of each beacon slot.

Figure 11:
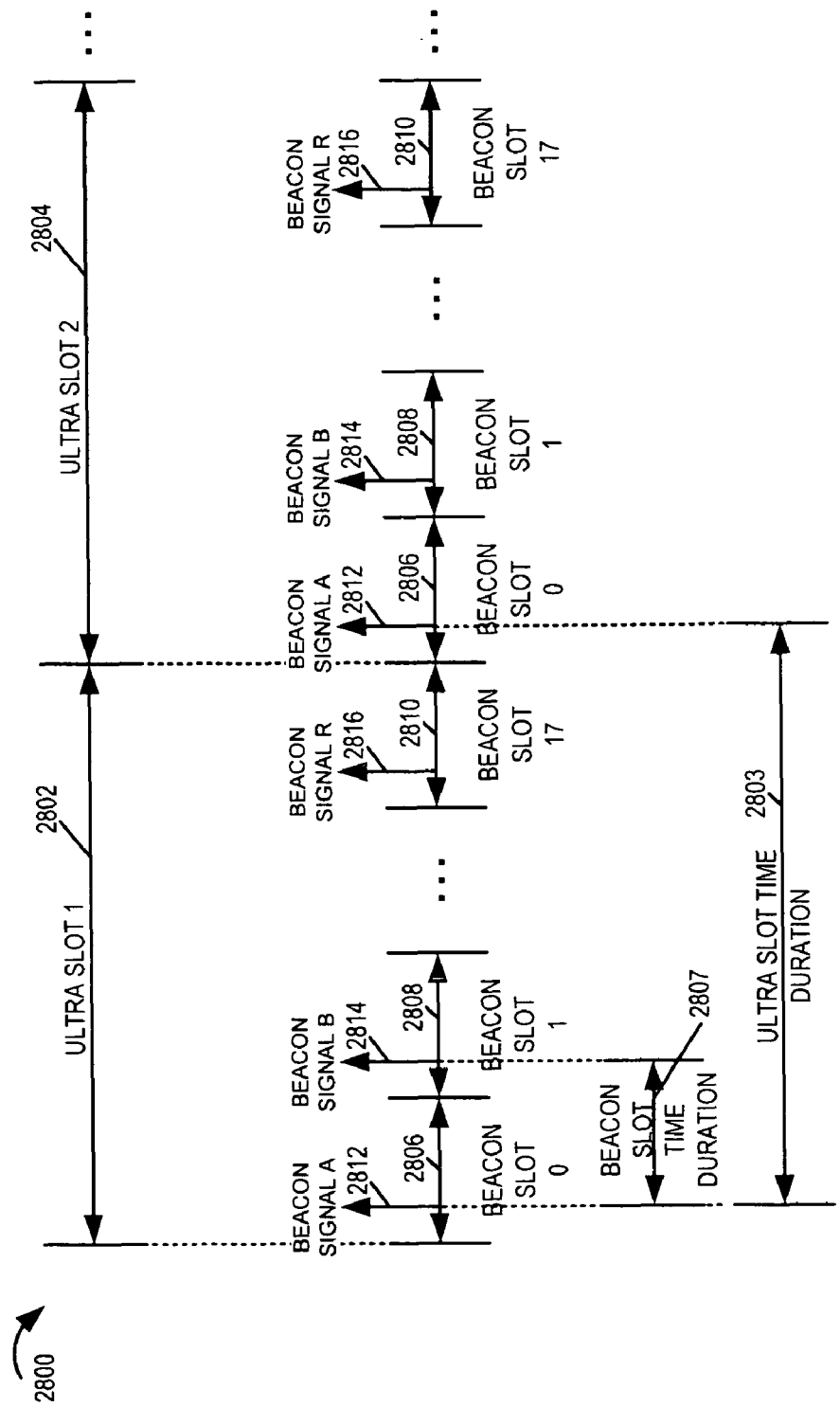
FIG. 11 is a drawing illustrating exemplary beacon signaling from a base station sector, implemented in accordance with various embodiments.

FIG. 11 is a drawing 2800 illustrating exemplary beacon signaling from a base station sector, implemented in accordance with various embodiments. Drawing 2802 illustrates 2 successive ultra slots (ultra slot 1 2802, ultra slot 2 2804). Ultra slot 1 2802 includes 18 indexed beacon slots (beacon slot 0 2806, beacon slot 1 2808, ..., beacon slot 17 2810). Each beacon slot (2806, 2808, ..., 2810) includes a corresponding beacon signal (beacon signal A 2812, beacon signal B 2814, ..., beacon signal R 2816), respectively. The pattern of beacon signaling repeats, in this exemplary embodiment, for the first ultra slot 2802 to the second ultra slot 2804. The interval between successive beacon signals is a beacon slot time duration 2807. The interval between the first beacon signal of ultra slot 1 2802 and first beacon signal of ultra slot 2 2804 is an ultra slot time duration 2803. In this example, a beacon signal is transmitted during the two strip intervals in the third super slot of each beacon slot.

Figure 12:
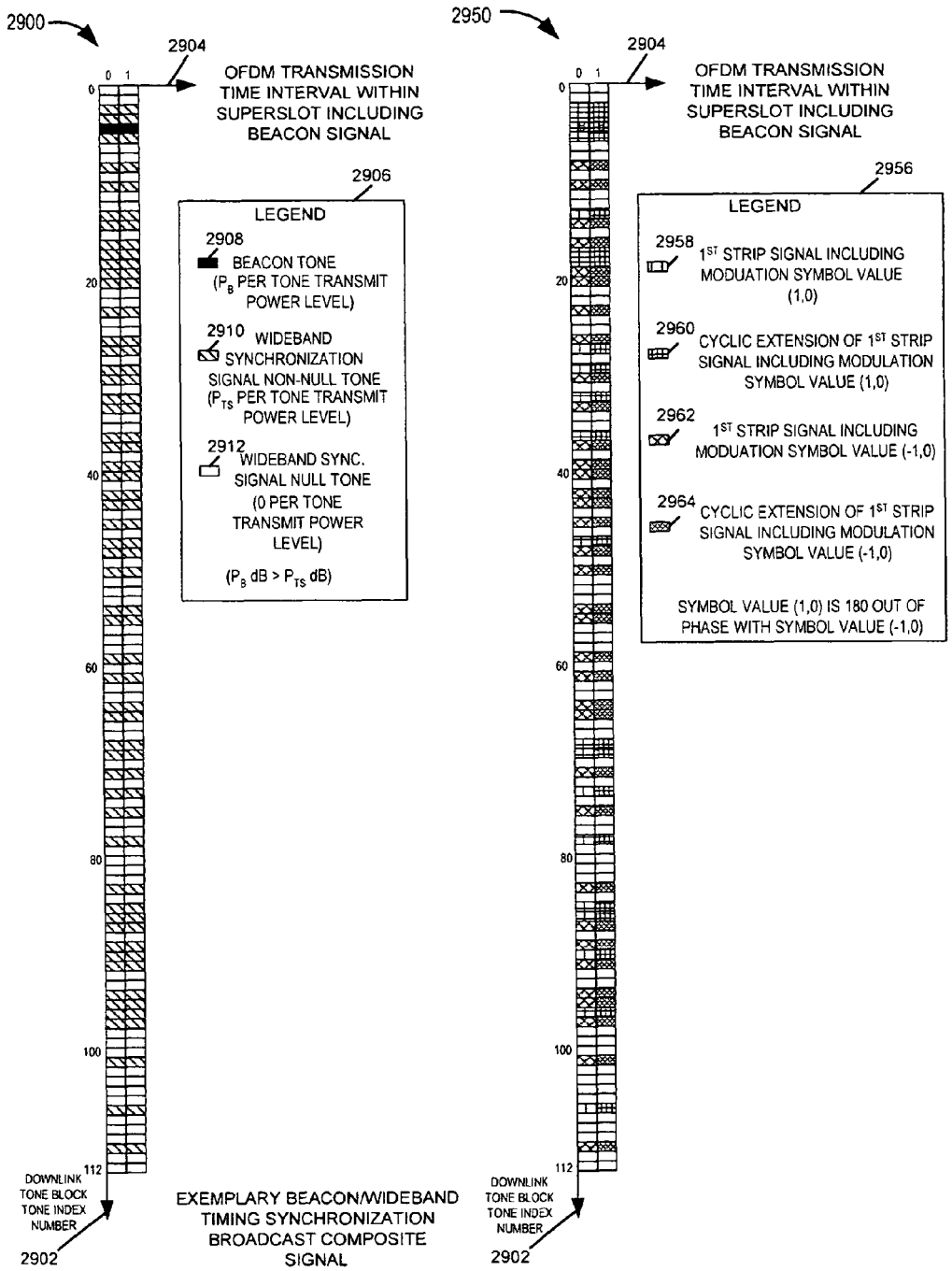
FIG. 12 is drawing illustrating exemplary beacon/wideband synchronization broadcast composite signaling in accordance with some embodiments.

FIG. 12 is drawing illustrating exemplary beacon/wideband synchronization broadcast composite signaling in accordance with some embodiments. Drawing 2900 illustrates an exemplary strip signaling segment, used to convey a composite beacon/wideband synchronization signal, information indicating which tones are used for an exemplary beacon signal, information indicating which tones are being used as non-null tones for an exemplary corresponding wideband synchronization signal, and information indicating which tones are intentional null tones of the wideband synchronization signal. Vertical axis 2902 indicates downlink tone block tone index number, which identifies 113 contiguous tones and ranges from tone index 0 to tone index 112. Horizontal axis 2904 indicates OFDM transmission time interval within the super slot including the beacon signal and ranges from 0 to 1. Each small block in grid 2900 represents the downlink air link resource of a tone-symbol. Legend 2906 indicates that (i) tone-symbols in drawing 2900 with full shading, as represented by exemplary fully shaded block 2908, are beacon tones transmitted at $P_B$ per tone transmit power level, (ii) tone-symbols in drawing 2900 with diagonal line shading, as represented by diagonal line shaded block 2910, are wideband synchronization signal non-null tones transmitted at $P_{TS}$ per tone transmit power level, where $P_B$ dB>$P_{TS}$ dB, and (iii) tone-symbols in drawing 2900 with no shading indicate that the tone is an intentional null tone of the wideband synchronization signal and no signal is transmitted on that tone and the per tone transmit power level is 0.

In this example, tone index=4 is a beacon tone and the set of tones 55 with index values={2, 3, 5, 8, 10, 13, 14, 16, 17, 18, 19, 20, 23, 26, 27, 29, 30, 32, 33, 36, 37, 39, 40, 42, 43, 45, 47, 48, 50, 54, 55, 59, 61, 64, 65, 68, 69, 71, 73, 75, 78, 83, 85, 86, 87, 89, 90, 91, 94, 95, 96, 97, 101, 106, 110} comprise the non-null wideband synchronization signal tones, and the remaining 57 tones are intentional null tones of the wideband synchronization signal and are left unused.

Drawing 2950 illustrates the same exemplary strip signaling segment of drawing 2900, used to convey the same composite beacon/wideband synchronization signal as represented in drawing 2900, and modulation symbol value information and signaling characteristics for each of the non-zero tone-symbols. Vertical axis 2902 indicates downlink tone block tone index number, which identifies 113 contiguous tones and ranges from tone index 0 to tone index 112. Horizontal axis 2904 indicates OFDM transmission time interval within the super slot including the beacon signal and ranges from 0 to 1. Each small block in grid 2950 represents the downlink air link resource of a tone-symbol. Legend 2956 indicates that (i) tone-symbols in drawing 2950 with low resolution vertical and horizontal line shading, as represented by exemplary block 2958, convey a $1^{st}$ strip signal including a modulation symbol value (1,0), (ii) tone-symbols in drawing 2950 with high resolution vertical and horizontal line shading, as represented by exemplary block 2960, convey a cyclic extension of the $1^{st}$ strip signal including a modulation symbol value (1,0), (iii) tone-symbols in drawing 2950 with low resolution crosshatch shading, as represented by exemplary block 2962, convey a $1^{st}$ strip signal including a modulation symbol value (−1,0), and (iv) tone-symbols in drawing 2950 with high resolution crosshatch shading, as represented by exemplary block 2964, convey a cyclic extension of the $1^{st}$ strip signal including a modulation symbol value (−1,0). The modulation symbol value (1,0) is 180 out of phase with the modulation symbol value (−1,0).

In this example, tone index=4 is a beacon tone and conveys modulation symbol value (1,0); tones with index values={2, 3, 5, 13, 17, 18, 26, 29, 32, 36, 47, 68, 69, 73, 78, 85, 86, 90, 96, 106,} each convey a modulation symbol value=(1,0); tones with index values={8, 10, 14, 16, 19, 20, 23, 26, 30, 33, 37, 39, 40, 42, 43, 45, 48, 50, 54, 55, 59, 61, 64, 65, 71, 75, 83, 85, 87, 89, 91, 94, 95, 97, 101, 110} each convey a modulation symbol value=(−1,0).

Figure 13:
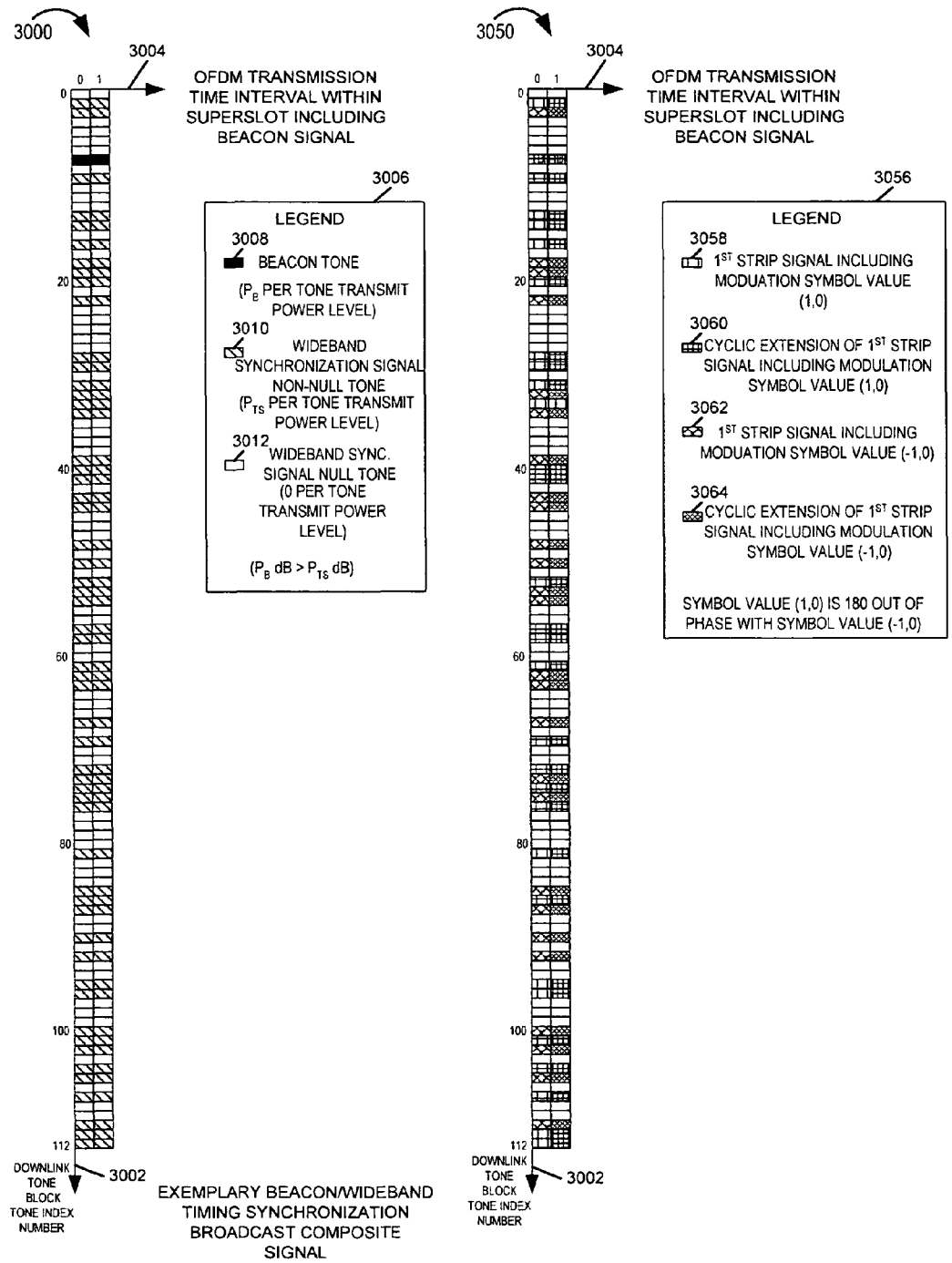
FIG. 13 is drawing illustrating another example of beacon/wideband synchronization broadcast composite signaling in accordance with some embodiments.

FIG. 13 is drawing illustrating another example of beacon/wideband synchronization broadcast composite signaling in accordance with some embodiments. Drawing 3000 illustrates an exemplary strip signaling segment, used to convey a composite beacon/wideband synchronization signal, information indicating which tones are used for an exemplary beacon signal, information indicating which tones are being used as non-null tones for an exemplary corresponding wideband synchronization signal, and information indicating which tones are intentional null tones of the wideband synchronization signal and are thus left unused. Vertical axis 3002 indicates downlink tone block tone index number, which identifies 113 contiguous tones and ranges from tone index 0 to tone index 112. Horizontal axis 3004 indicates OFDM transmission time interval within the super slot including the beacon signal and ranges from 0 to 1. Each small block in grid 3000 represents the downlink air link resource of a tone-symbol. Legend 3006 indicates that (i) tone-symbols in drawing 3000 with full shading, as represented by exemplary fully shaded block 3008, are beacon tones transmitted at $P_B$ per tone transmit power level, (ii) tone-symbols in drawing 3000 with diagonal line shading, as represented by diagonal line shaded block 3010, are non-null wideband synchronization tones transmitted at $P_{TS}$ per tone transmit power level, where $P_B$ dB>$P_{TS}$ dB, and (iii) tone-symbols in drawing 3000 with no shading indicate wideband synchronization signal intentional null tones on which no signal is transmitted on that tone and the per tone transmit power level is 0. In this example, tone index=7 is a beacon tone and the set of tones 55 with index values={1, 2, 9, 13, 14, 16, 18, 19, 20, 22, 28, 29, 31, 32, 33, 34, 39, 40, 41, 43, 44, 48, 50, 52, 53, 54, 57, 58, 61, 62, 63, 67, 69, 72, 73, 74, 75, 76, 81, 85, 86, 87, 90, 92, 95, 96, 100, 101, 102, 104, 105, 107, 110, 111, 112} comprise the non-null wideband synchronization tones, and the remaining 57 tones comprise the intentional null tones of the wideband synchronization signal which are left unused.

Drawing 3050 illustrates the same exemplary strip signaling segment of drawing 3000, used to convey the same composite beacon/wideband synchronization signal as represented in drawing 3000, and modulation symbol value information and signaling characteristics for each of the non-zero tone-symbols. Vertical axis 3002 indicates downlink tone block tone index number, which identifies 113 contiguous tones and ranges from tone index 0 to tone index 112. Horizontal axis 3004 indicates OFDM transmission time interval within the super slot including the beacon signal and ranges from 0 to 1. Each small block in grid 3000 represents the downlink air link resource of a tone-symbol. Legend 3056 indicates that (i) tone-symbols in drawing 3050 with low resolution vertical and horizontal line shading, as represented by exemplary block 3058, convey a $1^{st}$ strip signal including a modulation symbol value (1,0), (ii) tone-symbols in drawing 3050 with high resolution vertical and horizontal line shading, as represented by exemplary block 3060, convey a cyclic extension of the $1^{st}$ strip signal including a modulation symbol value (1,0), (iii) tone-symbols in drawing 3050 with low resolution crosshatch shading, as represented by exemplary block 3062, convey a $1^{st}$ strip signal including a modulation symbol value (−1,0), and (iv) tone-symbols in drawing 3050 with high resolution crosshatch shading, as represented by exemplary block 3064, convey a cyclic extension of the $1^{st}$ strip signal including a modulation symbol value (−1,0). The modulation symbol value (1,0) is 180 out of phase with the modulation symbol value (−1,0).

In this example, tone index=7 is a beacon tone and conveys modulation symbol value (1,0); tones with index values={1, 9, 13, 14, 16, 20, 28, 29, 31, 33, 40, 41, 52, 57, 58, 61, 69, 72, 74, 76, 81, 86, 95, 96, 101, 104, 107, 111, 112} each convey a modulation symbol value=(1,0); tones with index values={2, 18, 19, 22, 32, 34, 39, 43, 44, 48, 50, 53, 54, 62, 63, 67, 73, 75, 85, 87, 90, 92, 100, 102, 105, 110} each convey a modulation symbol value=(−1,0).

FIG. 14 illustrates features of beacon signaling used in some embodiments. In the example of FIG. 14, the drawing 3900 includes an exemplary downlink tone block of 113 tones (tone index 0, tone index 1, . . . , tone index 112) identifying that beacon tones can be on 36 specific indexed tones of the tone block, but do not occur on the other 77 tones. In some embodiments, a beacon signal uses one tone from the set of 36 tones. In addition in various embodiments, the different potential beacon tones are further partitioned into three subsets, e.g., the 36 different potential beacon tones are partitioned in three subsets of 12 tones each. This further division of potential beacon tones in subsets is, in some embodiments, used to further distinguish a potential beacon tone from an attachment point at a particular point in time in a recurring downlink timing structure being used by the base station attachment point. Legend 3902 identifies that members of the $1^{st}$ beacon tone subset are indicated by crosshatch shading, as indicated by example block 3904. Tones with index values {4, 13, 22, 31, 40, 49, 58, 67, 76, 85, 94, 103} correspond to the first subset. Legend 3902 identifies that members of the $2^{nd}$ beacon tone subset are indicated by vertical line shading, as indicated by example block 3906. Tones with index values {7, 16, 25, 34, 43, 52, 61, 70, 79, 88, 97, 106} correspond to the second subset. Legend 3902 identifies that members of the $3^{rd}$ beacon tone subset are indicated by diagonal line shading, as indicated by example block 3908. Tones with index values {10, 19, 28, 37, 46, 55, 64, 73, 82, 91, 100, 109} correspond to the second subset. It should be observed that adjacent beacon tones of the set of 36 beacon tones are separated by 3 tones. This intentional spacing facilities easier beacon detection, as a wireless terminal receiving the beacon tone, need not be precisely frequency synchronized with respect to the transmitting base station to be able to detect a beacon signal and associate the received beacon signal with a beacon tone.

For example, a frequency synchronization level of less than one tone interval is sufficient, in some embodiments, for a received beacon tone to be correctly associated with the intended tone index value.

In some embodiments, each beacon tone, is paired with a unique wideband synchronization signal, e.g., a unique signal including predetermined non-null tones conveying predetermined non-zero modulation symbol values and predetermined intentional null tones. For example in one embodiment with a tone block of 113 tones, a single beacon tone is paired with 54 or 55 non-null wideband synchronization tones. In some such embodiments, the other tones of the tone block for the composite beacon/wideband synchronization signal are intentionally set to null. For example, in the exemplary tone block of 113 tones 58 or 57 tones may be intentional null tones. In addition in some embodiments, the beacon and non-null wideband synchronization signal tones have fixed transmission power relationship levels. In some embodiments, a beacon tone symbol signal in a $1^{st}$ OFDM strip symbol transmission time interval has a modulation symbol value (1,0), while each of the corresponding timing and synchronization signals corresponding to a non-null tone have either a (1,0) or (−1,0) modulation signal value.

In some other embodiments during beacon signaling, the combination of beacon signal tone, corresponding non-null wideband synchronization signal tones, and intentional null tones occupies a portion, e.g., a majority, of the downlink tone block corresponding to a base station attachment point, with at least some tones of the downlink tone block being are simultaneously for other purposes, e.g., to communicate other control signal information.

Figures 15, 15A:
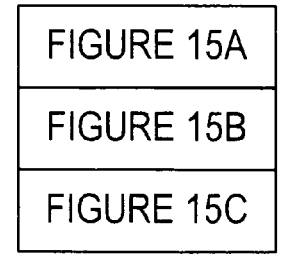
FIG. 15 comprising the combination of FIG. 15A, FIG. 15B
Figure 15B:
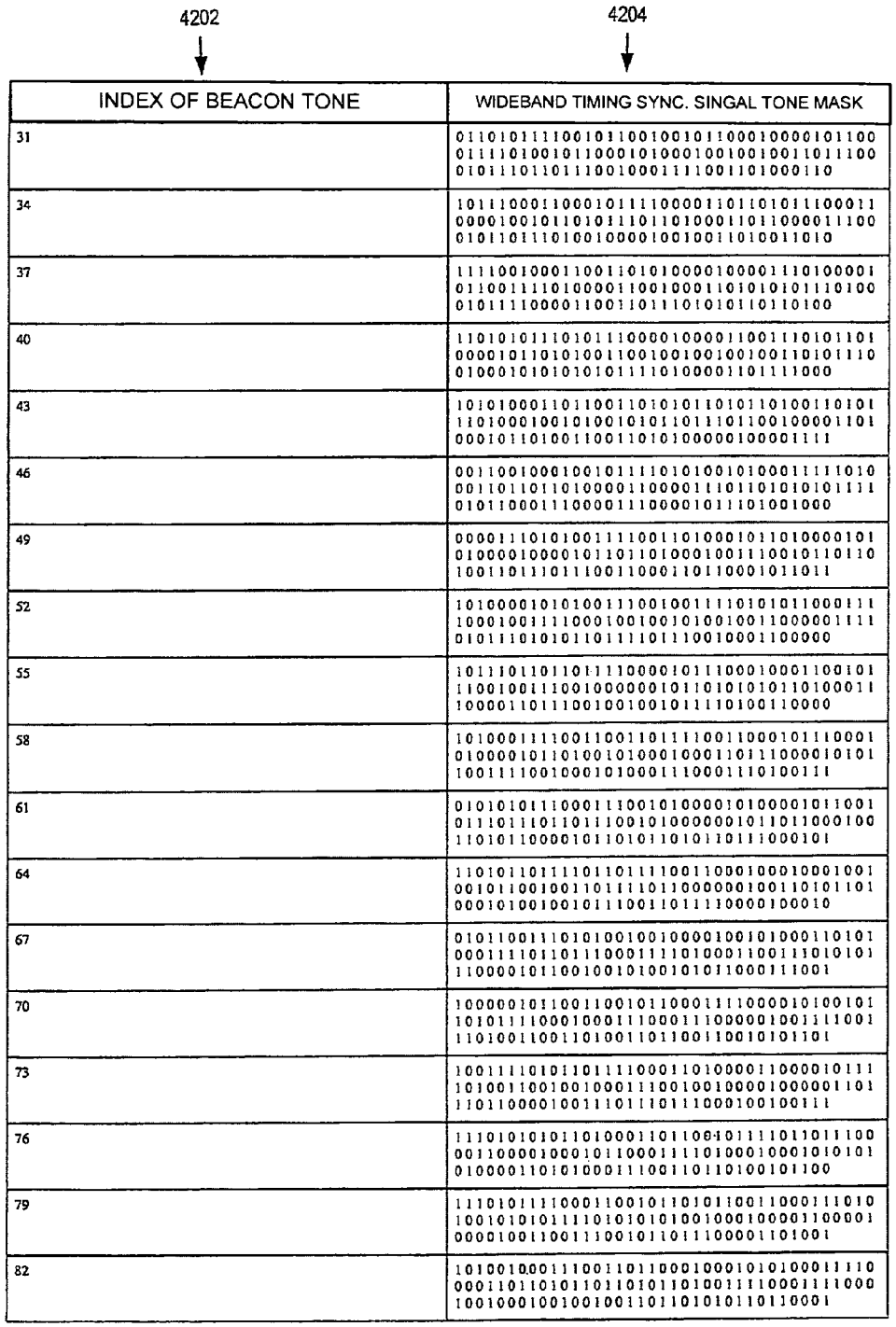
FIG. 15C is a table associating each of 36 potential beacon tones with a mask identifying which of the other 55 tones in the tone block of 113 tones are used as non-null wideband synchronization tones conveying a modulation symbol value in an exemplary embodiment.

As previously described each of the allowed beacon tones can be associated with a specific pattern of wideband synchronization signaling. FIG. 15 comprising the combination of FIG. 15A, FIG. 15B and FIG. 15C is a table 4200 associating each of the 36 potential beacon tones with a mask identifying which of the other 55 tones in the tone block of 113 tones are used as non-null wideband synchronization signal tones. First column 4202 identifies beacon tone and second column 4204 identifies a corresponding wideband synchronization signal tone mask. The tone mask is a binary vector of 113 elements, each of which is an element mask indicating whether a corresponding tone is one of the 55 non-null wideband synchronization signal tones. For a given beacon tone, the first element in the corresponding mask is the leftmost topmost element and corresponds to the tone with index=0. Indexing proceeds along the first row from left to right, then along the second row from left to right, and then along the third row from left to right until the last mask element is reached corresponding to tone index 112 in the tone block. A tone mask value=1 indicates that the wideband synchronization signal uses that tone as a non-null tone, while a value of 0 indicates the tone is not a non-null tone of the wideband synchronization signal. In some embodiments each of the tones identified with a 0 value are intentional null tones of the wideband synchronization signal unless the given tone index corresponds to the corresponding beacon tone index. In some embodiments, if a given tone is identified as a non-null wideband synchronization signal tone, but the tone corresponds to a DC tone, the tone is also intentionally nulled.

FIG. 16 comprising the combination of FIG. 16A and FIG. 16B is a table 4300 associating each of the 36 potential beacon tones with a set of 55 modulation symbol values. First column 4302 identifies beacon tone and second column 4304 identifies a corresponding set of wideband synchronization signal non-null tone values, where a 1 represents a modulation symbol value of (−1,0) and a 0 identifies a modulation symbol value of (1,0). Each modulation symbol value of the wideband synchronization signal corresponding to a tone identified by a mask value=1 in table 42, in the order indicated in table 42.

FIG. 12, previously described is an example of using the information from the tables of FIGS. 15 and 16 to construct a composite beacon/wideband synchronization signal for the exemplary case where the beacon tone has tone index=4. FIG. 13, previously described is an example of using the information from the tables of FIGS. 15 and 16 to construct a composite beacon/wideband synchronization signal for the exemplary case where the beacon tone has tone index=7.

Figure 17:
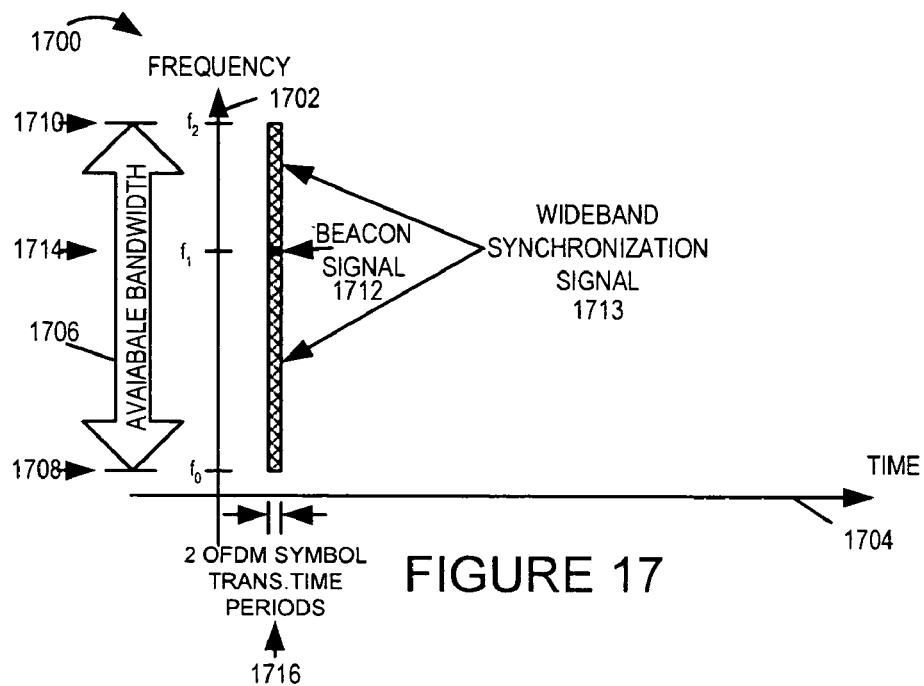
FIGS. 17 and 18 illustrate an exemplary OFDM beacon signal/wideband synchronization signal combination in accordance with an exemplary embodiment.
Figure 18:
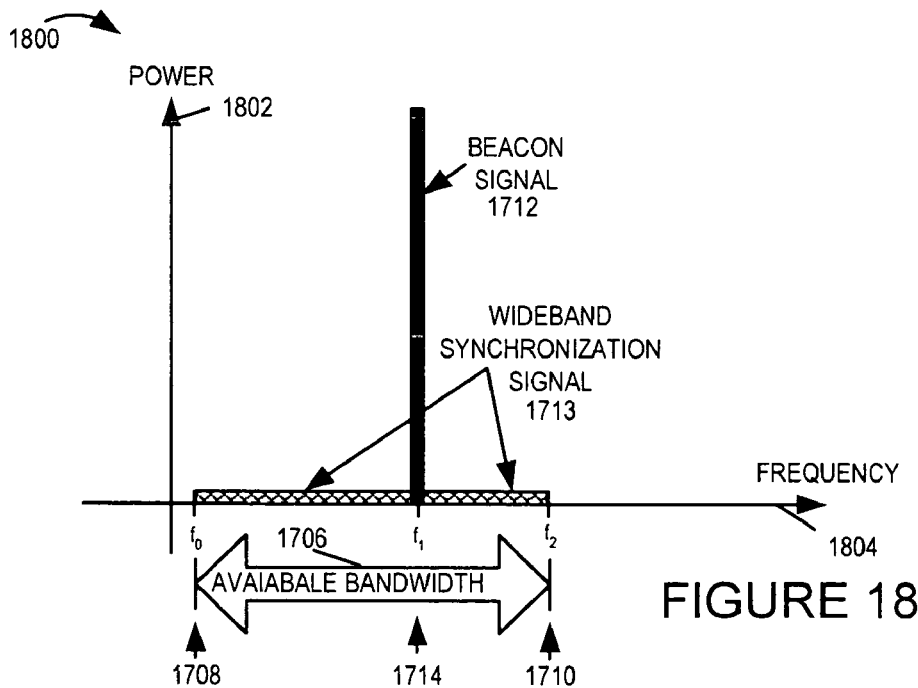

FIGS. 17 and 18 illustrate an exemplary OFDM beacon signal 1712/wideband synchronization signal 1713 combination in accordance with an exemplary embodiment. FIG. 17 is a drawing 1700 of frequency on vertical axis 1702 vs time on horizontal axis 1704. The available bandwidth 1706, e.g., for the exemplary communications band, covers the range from frequency $f_0$ 1708 to frequency $f_2$ 1710. The exemplary beacon signal 1712, e.g., a single tone, is at frequency $f_1$ 1714, and has a duration of 2 OFDM symbol transmission time periods 1716. The exemplary wideband synchronization signal 1713 may occupy a significant portion of the frequency band from $f_0$ 1708 to $f_2$ 1710 exclusive of the beacon signal tone or tones and also has a duration of 2 OFDM symbol transmission time periods. The beacon tone is paired with a corresponding wideband synchronization signal, the corresponding wideband synchronization signal includes predetermined null tones and predetermined non-null tones conveying non-zero predetermined modulation symbols values. Each pair of a beacon tone with a corresponding wideband synchronization signal includes a unique beacon tone and a unique wideband synchronization signal. Preferably, the exemplary wideband synchronization signal 1713 is a multi-tone signal including multiple tones transmitted simultaneously conveying non-zero modulation symbol values. The number of tones of the wideband synchronization signal conveying non-zero modulation symbol values is at least 10 or 20. In some cases, the number of tones of the wideband synchronization signal conveying non-zero modulation symbol values can be between 50 and 60, e.g., 55. The number of tones of the wideband synchronization signal conveying non-zero modulation symbol values is preferably close to the half of the total number of tones in the tone block. Note that those tones in the exemplary wideband synchronization signal conveying non-zero modulation symbol values are not necessarily contiguous. For example, suppose that all the available tones are indexed as 0, 1, 2, . . . , N−1, where N is the total number of tones. For example, N=113. Each tone corresponds to a tone frequency. Consider that the exemplary beacon tone has tone index=40 on which a modulation symbol at high power is transmitted, and the exemplary wideband synchronization signal includes tones 0, 1, 3, 5, 7, 8, 9, 11, 13, 14, 15, 20, 25, 26, 29, 30, 31, 33, 35, 36, 38, 43, 45, 46, 48, 50, 53, 54, 57, 60, 63, 66, 69, 70, 72, 74, 75, 76, 79, 83, 85, 87, 89, 91, 93, 94, 95, 96, 98, 103, 104, 106, 107, 108, 109 on which non-zero modulation symbol values are transmitted at a lower power level and tones 2, 4, 6, 10, 12, 16, 17, 18, 19, 21, 22, 23, 24, 27, 28, 32, 34, 37, 39, 41, 42, 44, 47, 49, 51, 52, 55, 56, 58, 59, 61, 62, 64, 65, 67, 68, 71, 73, 77, 78, 80, 81, 82, 84, 86, 88, 90, 92, 97, 99, 100, 101, 102, 105, 110, 111, 112 on which no energy is intentionally transmitted. The tones (0, 1, 3, 5, 7, 8, 9, 11, 13, 14, 15, 20, 25, 26, 29, 30, 31, 33, 35, 36, 38, 43, 45, 46, 48, 50, 53, 54, 57, 60, 63, 66, 69, 70, 72, 74, 75, 76, 79, 83, 85, 87, 89, 91, 93, 94, 95, 96, 98, 103, 104, 106, 107, 108, 109), in this example, convey modulation symbol values ((−1, 0), (−1,0), (−1,0), (1,0), (−1,0), (1,0), (−1,0), (−1,0), (1,0), (1,0), (−1,0), (−1,0), (−1,0), (1,0), (1,0), (1,0), (−1,0), (−1,0), (1,0), (1,0), (−1,0), (−1,0), (−1,0), (−1,0), (−1,0), (1,0), (1,0), (−1,0), (1,0), (1,0), (−1,0), (−1,0), (1,0), (−1,0), (−1,0), (1,0), (−1,0), (−1,0), (−1,0), (1,0), (1,0), (1,0), (−1,0), (−1,0), (1,0), (−1,0), (−1,0), (−1,0), (1,0), (−1,0), (−1,0), (−1,0), (1,0), (1,0), (1,0), (1,0)), respectively. In various embodiments, if the DC tone, e.g., tone with index=56 in tone block with index ranging from 0 to 112, is assigned to convey a non-zero modulation symbol value as part of the wideband synchronization signal, energy is not transmitted on the DC tone, e.g., the DC tone is treated as a null tone.

FIG. 18 is a drawing 1800 of power on vertical axis 1802 vs frequency on horizontal axis 1804 during the time that the beacon signal 1712 and wideband synchronization signal 1713 are transmitted. The base station transmitter transmission power is concentrated on the high power beacon signal 1712 at frequency $f_1$ 1714; however, the wideband synchronization signal 1713 is transmitted in parallel at a much lower power level. With the broadcast signal of FIGS. 17 and 18, the beacon signal component 1712 can be easily detected by the WT receiver, and identified, while the wideband synchronization signal 1713 allows for timing synchronization to be accomplished by the WT so that the WT can communicate with the identified BS at the appropriate access time.

Figure 19:
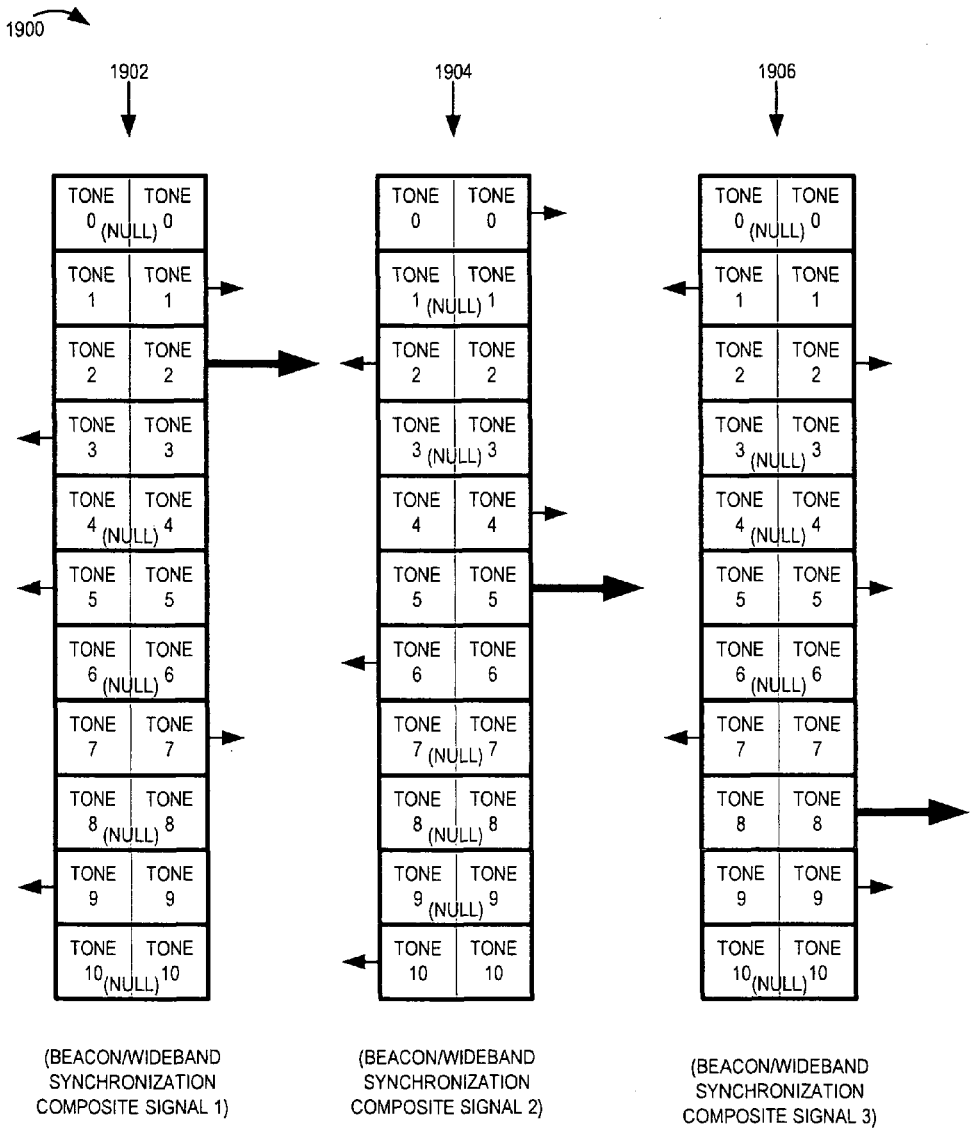
FIG. 19 is a drawing illustrating exemplary beacon/wideband synchronization composite signals in an exemplary basic embodiment.

FIG. 19 is a drawing 1900 illustrating exemplary beacon/wideband synchronization composite signals in an exemplary basic embodiment. The beacon/wideband synchronization composite signal facilitates easy detection and rapid channel estimation, even when the wireless terminal receiving the composite signal is not precisely timing and/or frequency synchronized with respect to the base station transmitter. The exemplary downlink tone block comprises 11 OFDM tones, indexed (0, 1, 2, . . . , 10). A beacon/wideband synchronization composite signal is communicated over two consecutive OFDM symbol transmission time intervals during predetermined times in a recurring downlink timing structure. A combination beacon/wideband synchronization signal includes an OFDM symbol during the first OFDM symbol transmission time interval including a body portion preceded by a cyclic prefix, and a cyclic extension symbol during the second OFDM symbol transmission time period. This extension portion facilitates information recovery at times when a wireless terminal is not synchronized with respect to the transmitter to within a cyclic prefix duration. The tones are intentionally not hopped between the two successive OFDM symbol transmission time periods of the composite beacon/timing synchronization signal. In contrast, an OFDM symbol conveying information including traffic channel user data follows a more conventional implementation; the user data OFDM symbol occupies a single OFDM symbol transmission time period, includes a body portion preceded by a cyclic prefix, and in some embodiments, the tones are hopped from one OFDM symbol to the next. A composite beacon/timing synchronization signal, for this exemplary embodiment, includes one tone allocated to the beacon, a set of tones, e.g., 5 tones, allocated to carry non-zero modulation symbols of the wideband synchronization signal and a set of tones, e.g., 5 tones, allocated to be intentional nulls as part of the wideband synchronization signal, said allocations being for the duration of the two consecutive OFDM symbol transmission time periods.

Drawing 1902 illustrates exemplary beacon/timing synchronization composite signal 1. Beacon/wideband synchronization composite signal 1 1902 uses: (i) tone 2 to communicate the modulation symbol of beacon signal as indicated by a large arrow, (ii) tones 1, 3, 5, 7, and 9 to convey non-zero modulation symbols of the wideband synchronization signal, and (iii) tones 0, 4, 6, 8, and 10 to be intentional null tones of the wideband synchronization signal. The size of the arrow associated with the beacon tone is larger than the size of the arrow associated with the non-zero modulation symbol tones of the wideband synchronization signal to indicate that the per tone transmission power level associated with the beacon signal is higher, e.g., by 3 dBs or more, than the average per tone transmission power level associated with the non-zero wideband synchronization signal tones. In addition, the direction of the arrow associated with a tone indicates the phase of the modulation symbol being conveyed by the tone. For example, tones 1, 2, and 7 convey a modulation symbol value of (1,0) while tones 3, 5, 9 convey a modulation symbol value of (−1,0).

Drawing 1904 illustrates exemplary beacon/wideband synchronization composite signal 2. Beacon/wideband synchronization composite signal 2 1904 uses: (i) tone 5 to communicate the modulation symbol of beacon signal as indicated by a large arrow, (ii) tones 0, 2, 4, 6, and 10 to convey non-zero modulation symbols of the wideband synchronization signal, and (iii) tones 1, 3, 7, 8, and 9 to be intentional null tones of the wideband synchronization signal. The size of the arrow associated with the beacon tone is larger than the size of the arrow associated with the non-zero modulation symbol tones of the timing synchronization signal to indicate that the transmission power level associated with the beacon signal is higher, e.g., by 3 dBs or more, than the transmission power level associated with the non-zero wideband synchronization signal tones. In addition, the direction of the arrow associated with a tone indicates the phase of the modulation symbol being conveyed by the tone. For example, tones 0, 4, and 5 convey a modulation symbol value of (1,0) while tones 2, 6, 10 convey a modulation symbol value of (−1,0).

Drawing 1906 illustrates exemplary beacon/wideband synchronization composite signal 3. Beacon/wideband synchronization composite signal 3 1906 uses: (i) tone 8 to communicate the modulation symbol of beacon signal as indicated by a large arrow, (ii) tones 1, 2, 5, 7, and 9 to convey non-zero modulation symbols of the timing synchronization signal, and (iii) tones 0, 3, 4, 6, and 10 to be intentional null tones of the wideband synchronization signal. The size of the arrow associated with the beacon tone is larger than the size of the arrow associated with the non-zero modulation symbol tones of the wideband synchronization signal to indicate that the transmission power level associated with the beacon signal is higher, e.g., by 3 dBs or more, than the transmission power level associated with the non-zero wideband synchronization signal tones. In addition, the direction of the arrow associated with a tone indicates the phase of the modulation symbol being conveyed by the tone. For example, tones 2, 5, 8, and 9 convey a modulation symbol value of (1,0) while tones 1 and 7 convey a modulation symbol value of (−1,0).

It should be noted that the beacon tones selected for potential beacon/wideband synchronization signal composite signals (tones 2, 5 and 8) do not include adjacent tones. In this example, the beacon tones are spaced apart by 3 tones, thus a guard band exists between potential beacon tones, and a wireless terminal which is not precisely frequency synchronized with respect to the base station transmitter can still unambiguously identify a beacon. In addition each of the possible beacon tones being used is matched with a unique set of non-null timing synchronization tones conveying predetermined modulation symbol values and a unique set of null tones, thus facilitating rapid channel estimation.

Figure 20:
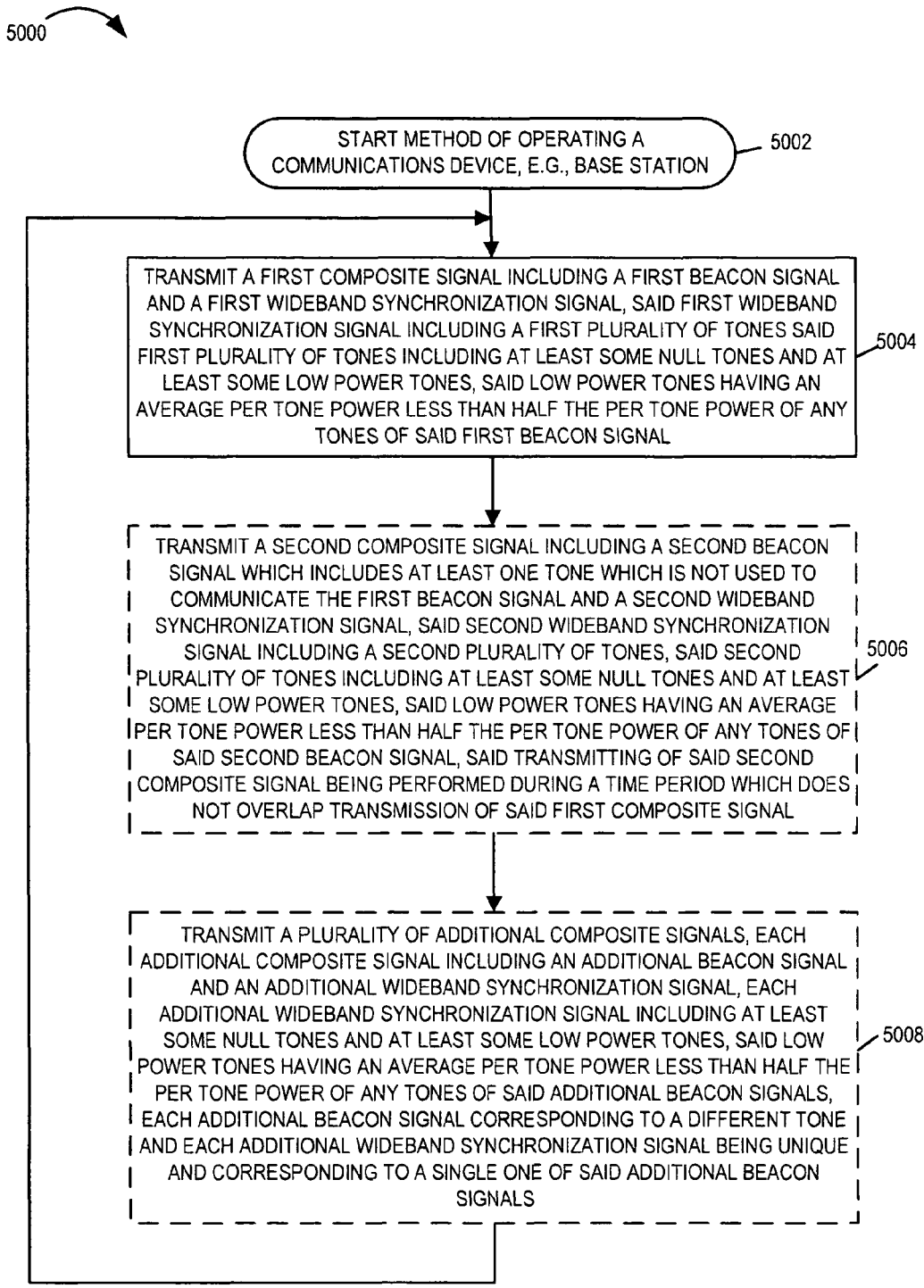
FIG. 20 is a flowchart of an exemplary method of operating a base station in accordance with various embodiments.

FIG. 20 is a flowchart 5000 of an exemplary method of operating a communications device, e.g., a base station, in accordance with various embodiments. The exemplary method starts in step 5002, where the communications device is powered on and initialized. Operation proceeds from start step 5002 to step 5004. In step 5004, the communications device is operated to transmit a first composite signal including a first beacon signal and a first wideband synchronization signal, said first wideband synchronization signal including a first plurality of tones said first plurality of tones including at least some null tones and at least some low power tones, said low power tones having an average per tone power less than half the per tone power of any tones of said first beacon signal. In various embodiments, the exemplary method includes one or more of steps 5006 and 5008.

In embodiments, which include step 5006, operation proceeds from step 5004 to step 5006. For example, in some embodiments, the communication device transmitter may frequency hop between different tones for the beacon signal. In step 5006, the communication device is operated to transmit a second composite signal including a second beacon signal which includes at least one tone which is not used to communicate the first beacon signal and a second wideband synchronization signal, said second wideband synchronization signal including a second plurality of tones, said second plurality of tones including at least some null tones and at least some low power tones, said low power tones having an average per tone power less than half the per tone power of any tones of said second beacon signal, said transmitting of said second composite signal being performed during a time period which does not overlap transmission of said first composite signal. For example, said first composite signal may be transmitted during two consecutive strip symbol intervals of a first beaconslot reserved for the first composite signal, and said second composite signal may be transmitted during two consecutive strip symbol intervals of a second beaconslot reserved for the second composite signal, the second beaconslot following the first beaconslot.

In embodiments, which include step 5008, operation proceeds from step 5006 to step 5008. In step 5008, the communications device is operated to transmit a plurality of additional composite signals, each additional composite signal including an additional beacon signal and an additional wideband synchronization signal, each additional wideband synchronization signal including at least some null tones and at least some low power tones, said low power tones having an average per tone power less than half the per tone power of any tones of said additional beacon signals, each additional beacon signal corresponding to a different tone and each additional wideband synchronization signal being unique and corresponding to a single one of said additional beacon signals.

Operation proceeds from step 5004, step 5006, or step 5008, depending on the inclusion or omission of step 5006 and/or 5008, to step 5004, where the communications device is operated to repeat the transmission of the first composite signal.

In some embodiments, the first beacon signal is a narrowband signal including at most two tones. In some such embodiments, the first beacon signal is a single tone signal. In various embodiments, the step of transmitting the first composite signal includes transmitting the first composite signal during a period of time which is greater than one symbol transmission time period. For example, the first composite signal, is in some embodiments, a two OFDM symbol transmission time period wide signal including a first OFDM symbol during the $1^{st}$ OFDM symbol transmission time period, said first OFDM symbol including a cyclic prefix portion and a body portion, and a second OFDM symbol during the $2^{nd}$ OFDM symbol transmission time period, said second OFDM symbol being an extension, e.g., continuation, of said first OFDM symbol body portion.

In various embodiments, the first wideband synchronization signal includes at least X tones, at least ¼ of said X tones included in said first wideband synchronization signal being null tones, where X is a positive integer greater than 4. In some such embodiments, X is at least 20. For example, in one exemplary embodiment a downlink tone block includes 113 contiguous tones, the beacon signal is one tone, X is 112 and approximately half of the X tones are null tones, e.g., 57 or 58 null tones.

In various embodiments, the first wideband synchronization signal includes non-null tones within said first wideband synchronization signal which are interspersed with said null tones according to a first predetermined pattern. For example, in an exemplary embodiment, the first wideband synchronization signal corresponds to one of the timing synchronization tone masks of table 4200 of FIG. 15.

In some embodiments, the non-null tones within the first wideband synchronization signal communicate modulation symbols values. In some such embodiments, a predetermined modulation symbol value in said first wideband synchronization signal can be any one of up to four different predetermined modulation symbol values. In some embodiments, a predetermined modulation symbol value in said first wideband synchronization signal is one of two different modulation symbol values. For example, in an exemplary embodiment, the first wideband synchronization signal corresponds to one of the timing synchronization tone set modulation value information sets of Table 4300 of FIG. 16, where an individual modulation symbol value of a non-null tone is one of (−1,0) or (1,0). In some embodiments, the beacon signal conveys a predetermined modulation symbol value which is the same as one of the predetermined modulation symbol values conveyed by the corresponding wideband synchronization signal, e.g., modulation symbol value (1,0).

In various embodiments, the first composite signal is an OFDM signal, said first composite signal having a different format from an OFDM symbol used to communicate user data. For example, the first composite signal is, in some embodiments, a signal using two consecutive OFDM symbol transmission time periods, said first composite signal including a cyclic prefix, a body portion and an extension portion, while an OFDM symbol used to communicate user data uses one OFDM symbol transmission time period and includes a cyclic prefix and a body portion. The relatively high per tone power level of the beacon signal facilitates detection and identification of the beacon signal. The additional extension portion of the first composite signal, facilitates recovery of the first composite signal's information, under conditions wherein the wireless terminal level's of synchronization with respect to the base station transmitter exceeds a cyclic prefix duration. Thus first composite signals may be successfully recovered by a wireless terminal which is unable to successfully recover user data inclusive OFDM symbols. In addition, in some such embodiments, tones are not hopped between successive OFDM symbol time periods of the first composite signal, while tones are hopped between two successive OFDM symbols being used to convey user data.

In some embodiments, in which the communications device, e.g., base station, transmits first and second composite signals, the second wideband synchronization signal include non-null tones which are the same as the non-null tones of the first wideband synchronization signal but which communicate on at least one non-zero tone a modulation symbol which is different from the modulation symbol communicated on at least one non-zero tone of the first wideband synchronization signal. In various embodiments, at least some non-null tones included in the second wideband synchronization signal are different than the non-null tones in said first wideband synchronization signal. In some embodiments, the first and second wideband synchronization signals are unique and map to first and second beacons, respectively. For example, in one exemplary embodiment, the first composite signal include one beacon tone of any of the possible beacon tones identified in FIG. 14, the second composite signal includes a different one of the beacon tones identified in FIG. 14, and the first and second wideband synchronization signals are defined by the information included in FIGS. 15 and 16.

Figure 21:
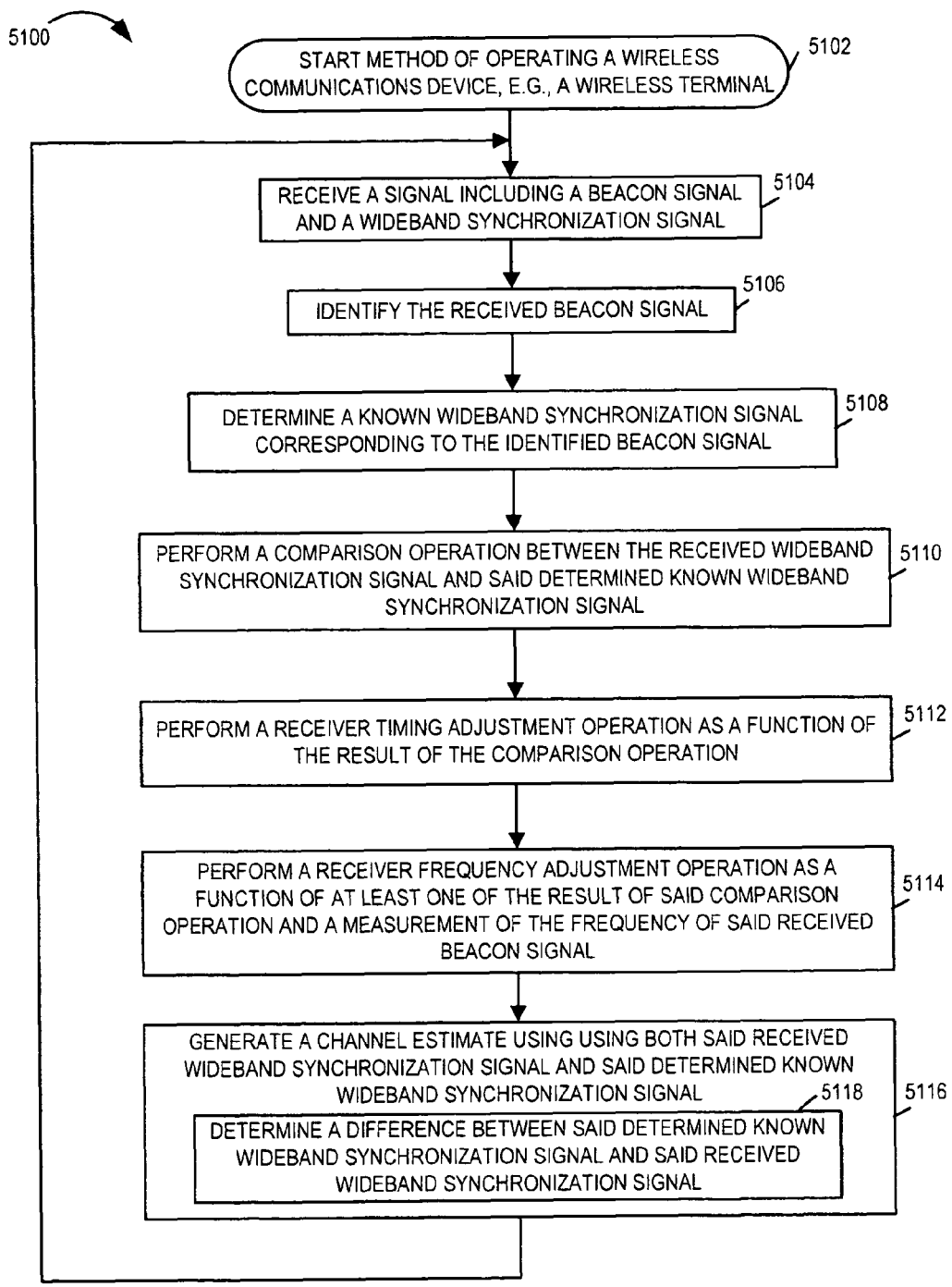
FIG. 21 is a flowchart of an exemplary method of operating a wireless terminal in accordance with various embodiments.

FIG. 21 is a flowchart 5100 of an exemplary method of operating a wireless communications device, e.g., a wireless terminal, in accordance with various embodiments. Operation of the exemplary method starts in step 5102, where the wireless communications device is powered on and initialized. Operation proceeds from start step 5102 to step 5104. In step 5104, the wireless communications device receives a signal including a beacon signal and a wideband synchronization signal. In various embodiments, the received beacon signal is a narrowband signal including at most two tones. In some such embodiments, the received beacon signal is a single tone signal. Operation proceeds from step 5104 to step 5106. In step 5106, the wireless communications device identifies the received beacon signal. For example, the beacon signal may be one of potential beacon signals being used by base station transmitters in the system. In one exemplary embodiment, the beacon signal is a high power single tone signal using one of the 36 potential beacon tones of FIG. 14. Next, in step 5108, the wireless communications device determines a known wideband synchronization signal corresponding to the identified beacon signal. For example, the wireless communications device uses the identified beacon tone index from step 5106 to determine a corresponding known wideband synchronization signal in accordance with information provided in Table 4200 of FIG. 15 and Table 4300 of FIG. 16.

Operation proceeds from step 5108 to step 5110. In step 5110, the wireless communications device performs a comparison between the received wideband synchronization signal and the determined known wideband synchronization signal. In various embodiments, the comparison of step 5110 is a correlation operation. Operation proceeds from step 5110 to step 5112. In step 5112, the wireless communications device performs a receiver timing adjustment operation as a function of the result of the comparison operation. In step 5114, the wireless communications device performs a receiver frequency adjustment operation as a function of at least one of the result of said comparison operation and a measurement of the frequency of said received beacon signal. In step 5116, the wireless communications device generates a channel estimate using both said received wideband synchronization signal and said determined known wideband synchronization signal. Step 5116 includes sub-step 5118. In sub-step 5118, the wireless communications device determines a difference between said determined known wideband synchronization signal and said received wideband synchronization signal. Operation proceeds from step 5116 to step 5104, where the wireless communications device receives another signal including a beacon signal and a wideband synchronization signal.

In various embodiments, the beacon signal is a narrowband signal including at most two tones. In some embodiments, the beacon signal is a single tone signal, e.g., a single tone signal being communicated over two consecutive OFDM symbol transmission time periods. In various embodiments, the wideband synchronization signal includes a plurality of tones, e.g., a plurality of tones allocated for the same two consecutive OFDM symbol transmission time periods of the corresponding beacon signal. In some embodiments, the set of tones of a tone block, e.g., a downlink tone block being used by a base station attachment point is the composite of an allocated beacon tone and the set of tones allocated to the corresponding wideband signal. In some embodiments, the DC tone is intentionally nulled as part of the OFDM symbol construction, irrespective as to whether or not the DC tone has been allocated to a non-null wideband synchronization signal modulation symbol value, thus in such an embodiment DC tone nulling overrides wideband synchronization signal value determination.

Figure 22:
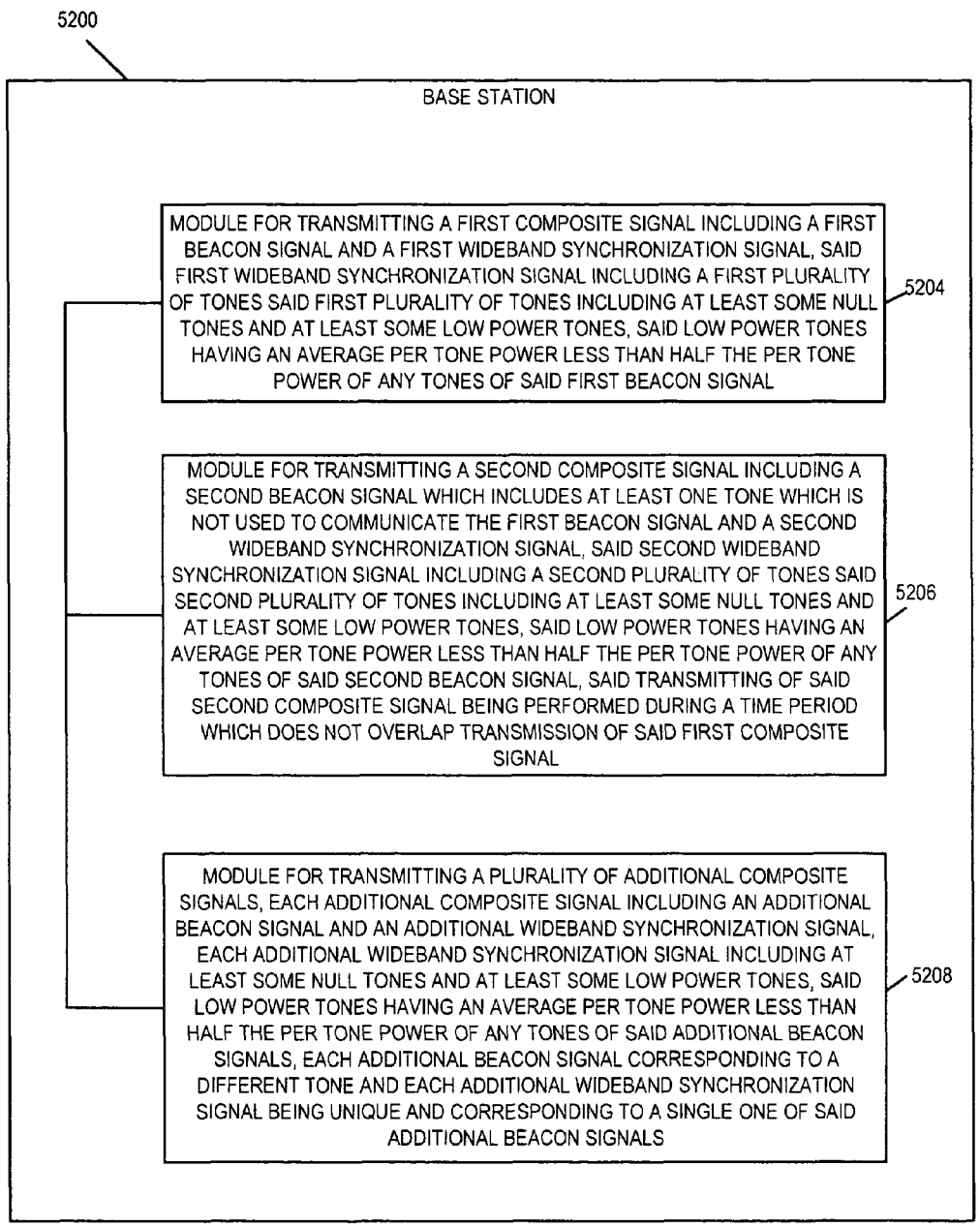
FIG. 22 is a drawing of an exemplary base station in accordance with various embodiments.

FIG. 22 is a drawing of an exemplary base station 5200 in accordance with various embodiments, which includes modules 5204, 5206 and 5208, which are coupled together. Exemplary base station 5200 may be any of the base stations of exemplary system 100 of FIG. 1. Exemplary base station 5200 may be used to implement the steps of the method of FIG. 20. Module 5204 is a module for transmitting a first composite signal including a first beacon signal and a first wideband synchronization signal, said first wideband synchronization signal including a first plurality of tones said first plurality of tones including at least some null tones and at least some low power tones, said low power tones having an average per tone power less than half the per tone power of any tones of said first beacon signal. Module 5206 is a module for transmitting a second composite signal including a second beacon signal which includes at least one tone which is not used to communicate the first beacon signal and a second wideband synchronization signal, said second wideband synchronization signal including a second plurality of tones, said second plurality of tones including at least some null tones and at least some low power tones, said low power tones having an average per tone power less than half the per tone power of any tones of said second beacon signal, said transmitting of said second composite signal being performed during a time period which does not overlap transmission of said first composite signal. Module 5208 is a module for transmitting a plurality of additional composite signals, each additional composite signal including an additional beacon signal and an additional wideband synchronization signal, each additional wideband synchronization signal including at least some null tones and at least some low power tones, said low power tones having an average per tone power less than half the per tone power of any tones of said additional beacon signals, each additional beacon signal corresponding to a different tone and each additional wideband synchronization signal being unique and corresponding to a single one of said additional beacon signals.

Figure 23:
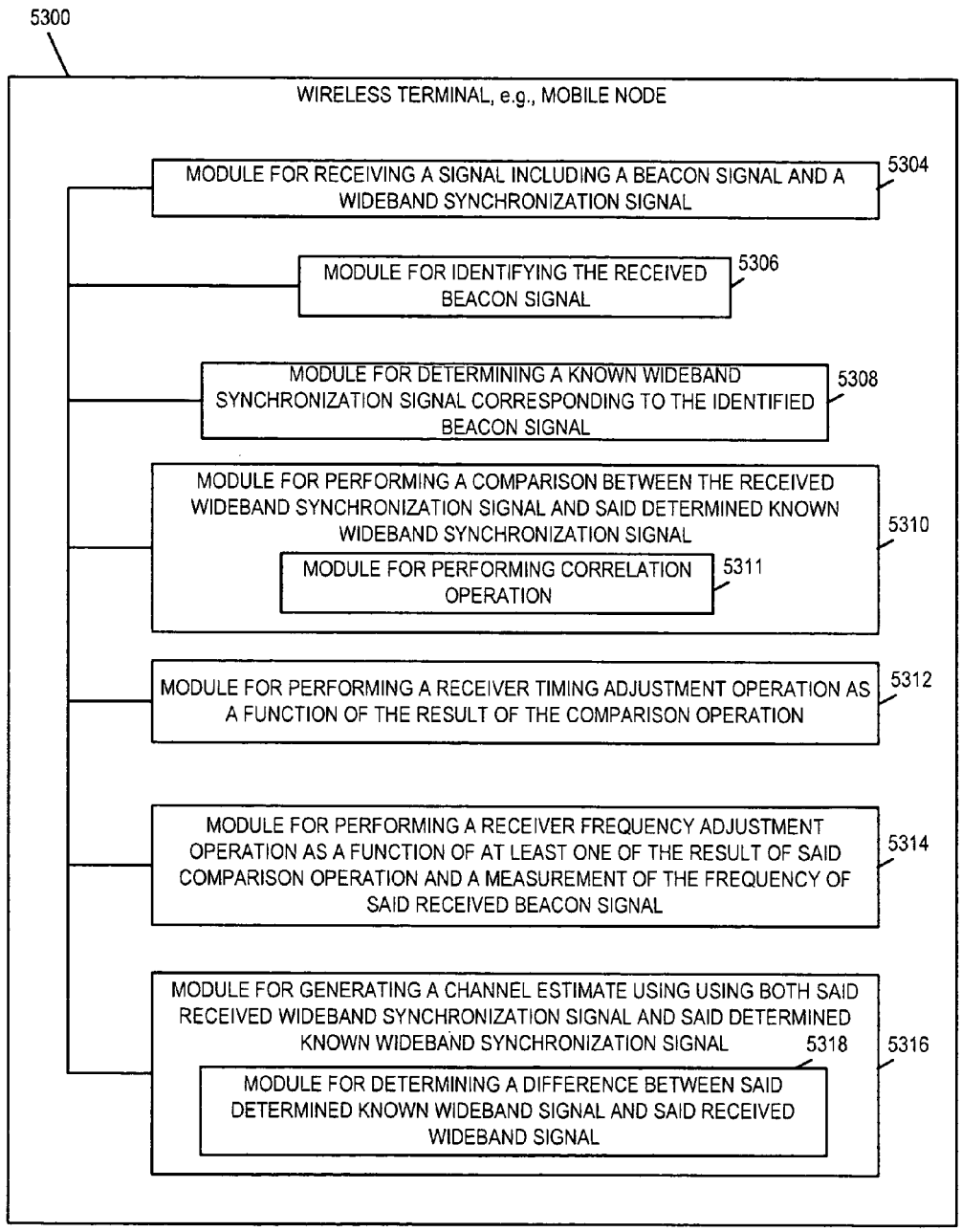
FIG. 23 is a drawing of an exemplary wireless terminal in accordance with various embodiments.

FIG. 23 is a drawing of an exemplary wireless terminal 5300, e.g., mobile node, in accordance with various embodiments. Exemplary wireless terminal 5300 may be any of the exemplary end nodes of the exemplary system 100 of FIG. 1. Exemplary wireless terminal 53000 may implement the steps of the method of FIG. 21. Exemplary wireless terminal 5300 includes module 5304, 5306, 5308, 5310, 5312, 5314, and 5316 coupled together. Module 5304 is a module for receiving a signal including a beacon signal and a wideband signal. Module 5306 is a module for identifying the received beacon signal obtained by module 5304. Module 5308 is a module for determining a known wideband synchronization signal corresponding to the identified beacon signal identified by module 5306. Module 5310 is a module for performing a comparison operation between the received wideband synchronization signal, obtained from module 5304, and the determined known wideband synchronization signal, determined from module 5308. Module 5310 includes module 5311, which is a module for performing a correlation operation. Module 5312 is a module for performing a receiver timing adjustment operation as a function of the result of the comparison operation performed by module 5310. Module 5314 is a module for performing a receiver frequency adjustment operation as a function of at least one of the result of the comparison operation of module 5310 and a measurement of the frequency of the received beacon signal, e.g., as performed by module 5306. Module 5316 is a module for generating a channel estimate using both said received wideband synchronization signal, obtained from module 5304, and said determined known wideband synchronization signal, obtained from module 5308. Module 5316 includes module 5318 which is a module for determining a difference between the determined known wideband synchronization signal obtained from module 5308 and the received wideband synchronization signal obtained from module 5304.

Figure 24:
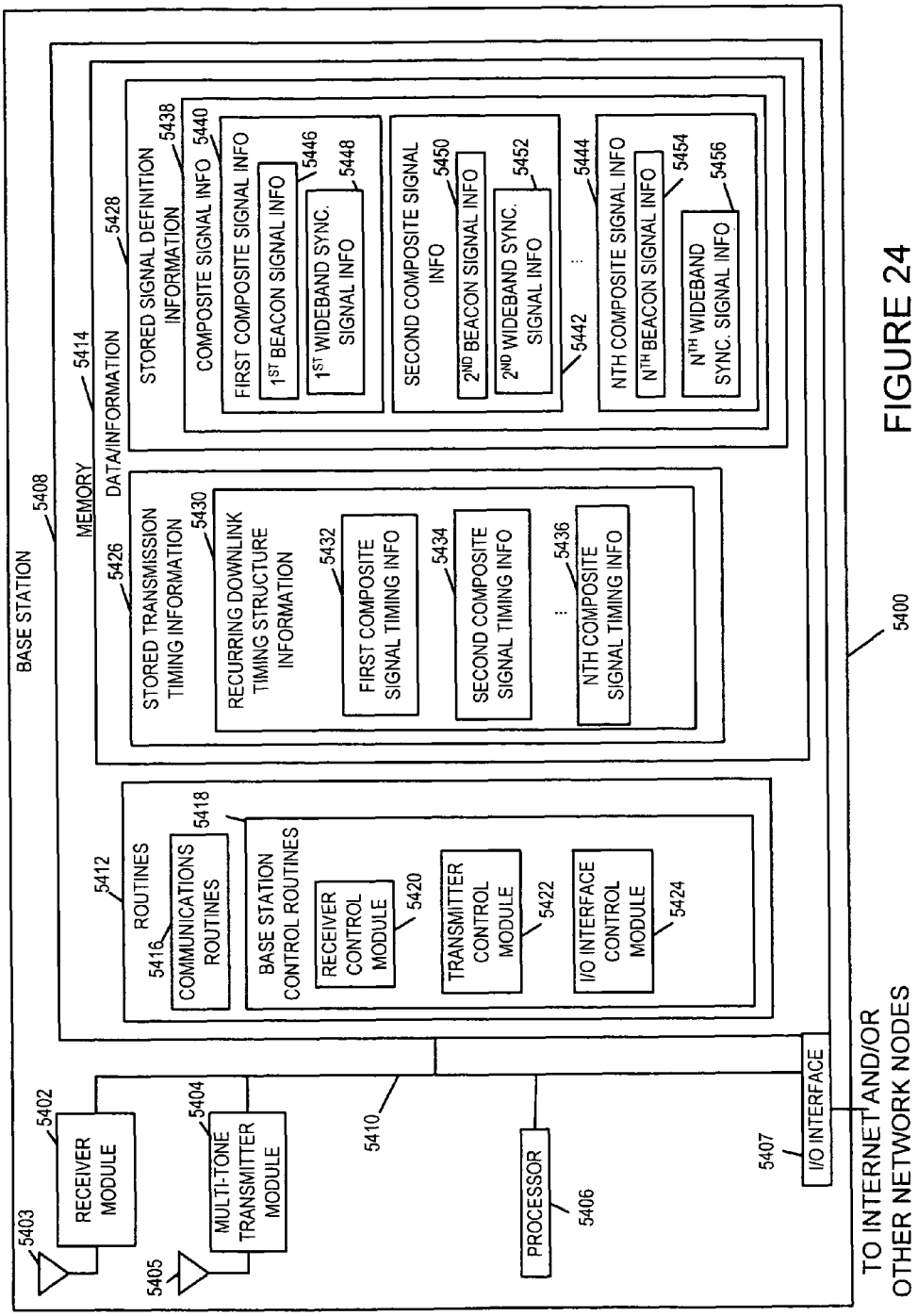
FIG. 24 is a drawing of an exemplary base station in accordance with various embodiments.

FIG. 24 is a drawing of an exemplary base station 5400 in accordance with various embodiments. Exemplary base station 5400 may be any of the exemplary base stations of exemplary system 100 of FIG. 1. Exemplary base station 5400 includes a receiver module 5402, a multi-tone transmitter module 5404, a processor 5406, an I/O interface 5407, and a memory 5408 coupled together via a bus 5410 over which the various elements may interchange data and information. Memory 5408 includes routines 5412 and data/information 5414. The processor 5406, e.g., a CPU, executes the routines 5412 and uses the data/information 5414 in memory 5408 to control the operation of base station 5400 and implement steps of methods.

Receiver module 5402, e.g., an OFDM receiver, is coupled to receive antenna 5403 via which the base station receives uplink signals from wireless terminals. Multi-tone transmitter module 5404, e.g., an OFDM transmitter, is coupled to transmit antenna 5405 via which the base station transmits downlink signals includes (i) composite signals, a composite signal including a beacon signal and a matched wideband synchronization signal, and (ii) OFDM symbols conveying user data information, e.g., OFDM symbols conveying modulation symbols corresponding to a downlink traffic channel segment.

I/O interface 5407 couples base station 5400 to the Internet and/or other network nodes, e.g., other base stations, routers, AAA nodes, home agent nodes, etc. I/O interface 5407, by coupling the base station 5400 to a backhaul network, allows a wireless terminal using a base station 5400 attachment point to participate in a communications session with a peer node using a different base station as its point of attachment.

Routines 5412 include a communications routines 5416 and base station control routines 5418. The communications routines 5416 implement various communications protocols used by base station 5400. The base station control routines 5418 include a receiver control module 5420, a transmitter control module 5422, an I/O interface control module 5424. The receiver control module 5420 control operation of receiver module 5402, e.g., tuning the receiver, controlling timing adjustments, controlling decoding and information recovery operations, etc. I/O interface control module 5424 controls the operation of I/O interface 5407, e.g., controlling the transmission and recovery of packets being communicated over the backhaul network.

The transmitter control module 5422 control operation of multi-tone transmitter module 5404, e.g., tuning the transmitter, controlling timing adjustments, controlling signal construction, transmission timing of generated signals, etc. The transmitter control module 5422 controls the multi-tone transmitter 5404 to transmit a first composite signal including a first beacon signal and a first wideband synchronization signal, said first wideband synchronization signal including a first plurality of tones, said first plurality of tones including at least some null tones and at least some low power tones, said low power tones having an average per tone power less than half the per tone power of any tones of the first beacon signal. The transmitter control module 5422 also controls the multi-tone transmitter 5404 to repeat the transmission of the first composite signal on a recurring basis.

In various embodiments, the first beacon signal is a narrowband signal including at most two tones. In some such embodiments, the first beacon signal is a single tone signal. In some embodiments, the first composite signal has a duration which is greater than one symbol transmission time period. In various embodiments, the first wideband synchronization signal includes at least X tones, at least ¼ of said X tone included in said first wideband synchronization signal being null tones, where X is a positive integer greater than 4. In some such embodiments X is at least 20. In various embodiments, the first wideband synchronization signal includes non-null tones which are interspersed with said null tones according to a first predetermined pattern. In some such embodiments, the non-null tones within said first wideband synchronization signal communicate predetermined modulation symbol values. In various embodiments, a predetermined modulation symbol value in a first wideband synchronization signal can be any one of up to 4 different predetermined modulation symbol values. In some such embodiments, a predetermined modulation symbol value in a first wideband synchronization signal can be any one of up to 2 different predetermined modulation symbol values.

The transmitter control module 5422 further controls the multi-tone transmitter 5404, as a function of stored transmission timing information and stored signal definition information to transmit a second composite signal including a second beacon signal, which includes at least one tone which is not used to communicate the first beacon signal, and a second wideband synchronization signal, said second wideband synchronization signal including a second plurality of tones, said second plurality of tones including at least some null tones and at least some low power tones, said low power tones having an average per tone power less than half the per tone power of any tones of the second beacon signal, said transmitting of said second composite signal being performed during a time period which does not overlap transmission of said first composite signal. The transmitter control module 5422 also controls the multi-tone transmitter 5404 to repeat the transmission of the second composite signal on a recurring basis.

The transmitter control module 5422 further controls the multi-tone transmitter 5404, as a function of stored transmission timing information and stored signal definition information to transmit, e.g., on a recurring basis, additional composite signals, an additional composite signal including a beacon signal and a corresponding wideband synchronization signal.

Data/information 5414 includes stored transmission timing information 5426 and stored signal definition information 5428. Stored transmission timing information 5426 includes recurring downlink timing structure information 5430. The recurring downlink timing structure information 5430 includes first composite signal timing information 5432, second composite signal timing information 5434, . . . , Nth composite signal timing information 5436.

First composite signal timing information 5432 includes transmission timing information indicating when the first composite signal is to be transmitted, e.g., a timing position within a recurring downlink timing structure being used by the base station transmitter. Second composite signal timing information 5434 includes transmission timing information indicating when the second composite signal is to be transmitted, e.g., a timing position within a recurring downlink timing structure being used by the base station transmitter. Nth composite signal timing information 5436 includes transmission timing information indicating when the Nth composite signal is to be transmitted, e.g., a timing position within a recurring downlink timing structure being used by the base station transmitter.

Stored signal definition information 5428 includes composite signal information 5438. Composite signal information 5438 includes first composite signal information 5440, second composite signal information 5442, . . . , Nth composite signal information 5444. First composite signal information 5440 includes $1^{st}$ beacon signal information 5446 and $1^{st}$ wideband synchronization signal information 5448. Second composite signal information 5442 includes $2^{nd}$ beacon signal information 5450 and $2^{nd}$ wideband synchronization signal information 5452. Nth composite signal information 5444 includes $N^{th}$ beacon signal information 5454 and $N^{th}$ wideband synchronization signal information 5456.

First composite signal information 5440 includes information defining the first composite signal, e.g., power level information, tone information, modulation symbol information associated with tones, which tone or tones are included in the beacon signal, which tones are included in the wideband synchronization signal as null tones, which tones are included in the wideband synchronization signal as low power tones, etc. $1^{st}$ beacon signal information 5446 includes information identifying the tone or tones of the beacon signal included in the first composite signal, information identifying the modulation symbol value conveyed by a beacon tone, and information identifying the power level associated with a beacon signal tone. $1^{st}$ wideband synchronization signal information 5448 includes information identifying the tones of the $1^{st}$ wideband synchronization signal, which of those tones are null tones, which of those tones are low power tones, power level information associated with the low power tones, and predetermined modulation symbol values associated with the low power tones.

Second composite signal information 5442 includes information defining the second composite signal, e.g., power level information, tone information, modulation symbol information associated with tones, which tone or tones are included in the beacon signal, which tones are included in the wideband synchronization signal as null tones, which tones are included in the wideband synchronization signal as low power tones, etc. $2^{nd}$ beacon signal information 5450 includes information identifying the tone or tones of the beacon signal included in the second composite signal, information identifying the modulation symbol value conveyed by a beacon tone, and information identifying the power level associated with a beacon signal tone. $2^{nd}$ wideband synchronization signal information 5452 includes information identifying the tones of the $2^{nd}$ wideband synchronization signal, which of those tones are null tones, which of those tones are low power tones, power level information associated with the low power tones, and predetermined modulation symbol values associated with the low power tones.

Nth composite signal information 5444 includes information defining the Nth composite signal, e.g., power level information, tone information, modulation symbol information associated with tones, which tone or tones are included in the beacon signal, which tones are included in the wideband synchronization signal as null tones, which tones are included in the wideband synchronization signal as low power tones, etc. $N^{th}$ beacon signal information 5454 includes information identifying the tone or tones of the beacon signal included in the Nth composite signal, information identifying the modulation symbol value conveyed by a beacon tone, and information identifying the power level associated with a beacon signal tone. $N^{th}$ wideband synchronization signal information 5456 includes information identifying the tones of the $N^{th}$ wideband synchronization signal, which of those tones are null tones, which of those tones are low power tones, power level information associated with the low power tones, and predetermined modulation symbol values associated with the low power tones.

In various embodiments, the stored signal information 5438 indicates that said the second wideband synchronization signal includes non-null tones which are the same as the non-null tones of the first wideband synchronization signal but which communicate on at least one non-zero tone a modulation symbol which is different from the modulation symbol communicated on the at least one non-zero tone of the first wideband synchronization symbol. For example, in one exemplary embodiment, both first wideband synchronization signal and second wideband synchronization signal may use tone with index=2 as a non-null tone, but first wideband synchronization signal may convey modulation symbol with value (1,0) on that tone while second wideband synchronization signal may convey modulation symbol with value (−1,0) on that tone.

In various embodiments, the stored signal information 5438 indicates that at least some non-null tones included in the second wideband synchronization signal are different than non-null tones included in said first wideband synchronization signal. For example, in one exemplary embodiment tones with index=111 and 112 are included as non-null tones in the second wideband synchronization signal, and those tones are not used as non-null tones in the first wideband synchronization signal.

In some embodiments, the first and second wideband synchronization signals are unique and map to first and second beacon signals respectively. For example, first wideband synchronization signal may correspond to beacon tone with tone index=4 and be defined by information including the information of Tables 4200 and 4300 of FIGS. 15 and 16 associated with beacon tone having index=4. Continuing with the example, second wideband synchronization signal may correspond to beacon tone with tone index=7 and be defined by information including the information of Tables 4200 and 4300 of FIGS. 15 and 16 associated with beacon tone having index=7.

In some embodiments, the set of composite signals defined by stored signal information 5438 defines each of a plurality of composite signals in addition to said first and second composite signals, each additional composite signal including a beacon signal and a corresponding wideband synchronization signal, each wideband synchronization signal including at least some null tones and at least some low power tones, said low power tones having an average per tone power level less than half the per tone power level of any tones a corresponding beacon signal. In some such embodiments, each additional beacon signal corresponds to a different tone and each additional wideband signal being unique and corresponding to a single one of said additional beacon signals. For example, in one exemplary embodiment, the set of N composite signals is a subset of the 36 potential composite signals defined by information included in FIGS. 15 and 16.

Figure 25:
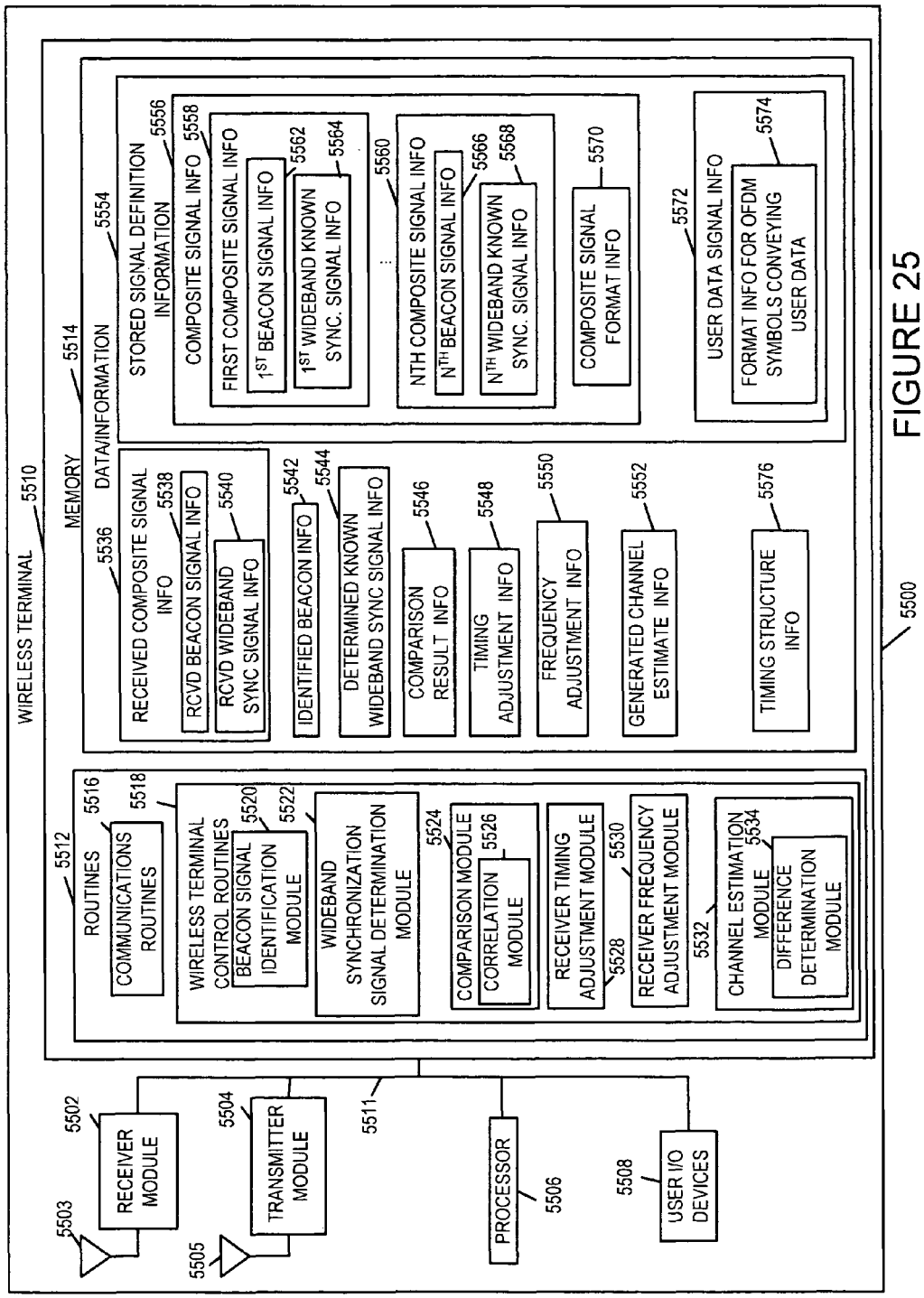
FIG. 25 is a drawing of an exemplary wireless terminal in accordance with various embodiments.

FIG. 25 is a drawing of an exemplary wireless terminal 5500, e.g., mobile node, implemented in accordance with various embodiments. Exemplary wireless terminal 5500 may be any of the exemplary end nodes of the exemplary system 100 of FIG. 1. Exemplary wireless terminal 5500 includes a receiver module 5502, a transmitter module 5504, a processor 5506, user I/O devices 5518, and a memory 5510 coupled together via a bus 5511 over which the various elements may interchange data and information. Memory 5510 includes routines 5512 and data/information 5514. The processor 5506, e.g., a CPU, executes the routines 5512 and uses the data/information 5514 in memory 5510 to control the operation of the wireless terminal 5500 and implement methods.

Receiver module 5502, e.g., an OFDM receiver, is coupled to receive antenna 5503 via which the wireless terminal receives downlink signals from base stations. The received downlink signals include composite signals, a composite signal including a beacon signal and a corresponding wideband timing synchronization signal. The received downlink signals also include other OFDM signals, e.g., OFDM symbol conveying user data.

Transmitter module 5504, e.g., an OFDM transmitter, is coupled to transmit antenna 5505 via which the wireless terminal transmits uplinks signals to base stations. User I/O devices 5508, e.g., microphone, keyboard, keypad, camera, switches, speaker, display, etc., allow a user of wireless terminal 5500 to input data/information, access output data/information, control applications, and execute operations, e.g., initiate a communications session.

Routines 5512 include communications routines 5516 and wireless terminal control routines 5518. The communications routines 5516 implement various communications protocols used by the wireless terminal 5500. Wireless terminal control routines 5518 include a beacon signal identification module 5520, a wideband synchronization signal determination module 5522, a comparison module 5524, a receiver timing adjustment module 5528, a receiver frequency adjustment module 5530, and a channel estimation module 5532. The comparison module 5524 includes a correlation module 5526. The channel estimation module 5532 includes a difference determination module 5534.

The beacon signal identification module 5520 identifies a received beacon signal, e.g., from among a plurality of potential beacon signals. For example, in one embodiment, the beacon signal may be a single tone signal, e.g., corresponding to one of the 36 potential beacon tones of FIG. 14, with each potential beacon tone matching one of potential beacon signal information ($1^{st}$ beacon signal info 5562, . . . , Nth beacon signal information 5566), and beacon identification module 5556 determines a match, e.g., based on frequency information of received beacon signal information 5538 compared to the potential alternatives in ($1^{st}$ beacon signal info 5562, . . . , Nth beacon signal information 5566). Thus beacon signal identification module 5520 processes received composite signal information 5536 including received beacon signal information 5538 and determines identified beacon information 5542, identifying one of the N potential beacon signals.

Wideband synchronization signal determination module 5522 determines a known wideband signal corresponding to the identified beacon signal. Module 5522 uses the identified beacon information 5542 to determine a known wideband synchronization signal having the characteristics of one of ($1^{st}$ wideband known synchronization signal information 5564, . . . , Nth wideband known synchronization signal information 5568), the known wideband synchronization signal being paired with the identified beacon signal. For example, consider that the identified beacon signal uses tone with index=10 (See FIG. 14), the wideband synchronization signal determination module 5522 determines the identified wideband synchronization signal to have the characteristics identified by tables 4200 and 4300 corresponding to beacon tone with index=10 (See FIGS. 15 and 16), e.g., tones with index (1, 2, 3, 4, 6, 7, 8, 9, 11, 13, 17, 18, 21, 22, 23, 26, 28, 29, 31, 32, 34, 37, 38, 39, 40, 41, 43, 45, 47, 48, 49, 52, 58, 61, 62, 63, 64, 70, 71, 72, 74, 77, 78, 80, 81, 82, 83, 89, 91, 95, 96, 98, 102, 106, 108, 109, 112) are nulls, tones with index (0, 5, 12, 14, 15, 16, 19, 20, 24, 25, 27, 30, 33, 35, 36, 42, 44, 46, 50, 51, 53, 54, 55, 56, 57, 59, 60, 65, 66, 67, 68, 69, 73, 75, 76, 79, 84, 85, 86, 87, 88, 90, 92, 93, 94, 97, 99, 100, 101, 103, 104, 105, 107, 110, 111) convey non-zero low power modulation symbols ((1,0), (−1,0), (1,0), (1,0), (1,0), (−1,0), (1,0), (−1,0), (−1,0), (−1,0), (−1,0), (1,0), (−1,0), (1,0), (−1,0), (1,0), (1,0), (−1,0), (−1,0), (−1,0), (−1,0), (−1,0), (1,0), (−1,0), (−1,0), (1,0), (−1,0), (1,0), (−1,0), (−1,0), (−1,0), (−1,0), (1,0), (−1,0), (−1,0), (1,0), (−1,0), (−1,0), (−1,0), (1,0) at a predetermined fixed power level, respectively. Determined known wideband synchronization signal information 5544 is an output of wideband synchronization signal determination module 5522.

Comparison module 5524 performs a comparison operation including comparing the received wideband synchronization signal 5540 to the determined know wideband synchronization signal information, e.g., information 5544 obtaining comparison result information 5546. The comparison module 5524 includes a correlation module 5526 for performing a correlation operation.

Receiver timing adjustment module 5528 performs a receiver 5502 timing adjustment operation as a function of the result of the comparison operation. Receiver frequency adjustment module 5530 performs a receiver 5502 frequency adjustment operation as a function of at least one of the result of the comparison operation and a measurement of the frequency of the received beacon signal.

Channel estimation module 5532 generates a channel estimate using both said received wideband synchronization signal and said determined known wideband synchronization signal. Difference determination module 5534 determines a difference between the determined known wideband synchronization signal and the received wideband synchronization signal.

Data/information 5514 includes received composite signal information 5536, identified beacon information 5542, determined known wideband synchronization signal information 5544, comparison result information 5546, timing adjustment information 5548, frequency adjustment information 5550, generated channel estimate information 5552, stored signal definition information 5554, and timing structure information 5576.

Received composite signal information 5536 includes received beacon signal information 5538 and received wideband synchronization signal information 5540.

Stored signal definition information 5554 includes composite signal information 5556 and user data signal information 5572.

Composite signal information 5556 includes a plurality of sets of composite signal information (first composite signal information 5558, . . . , Nth composite signal information 5560), and composite signal format information. First composite signal information 5558 includes $1^{st}$ beacon signal information 5562 and $1^{st}$ wideband known synchronization signal information 5564. Nth composite signal information 5560 includes Nth beacon signal information 5566 and Nth wideband known synchronization signal information 5568. $1^{st}$ beacon signal information 5562 includes information identifying the $1^{st}$ beacon signal, e.g., information identifying the tone or tones of a $1^{st}$ beacon signal and information identifying the power level associated with the beacon tone or tones. $1^{st}$ wideband known synchronization signal information 5564 includes information identifying: the set of tones of the $1^{st}$ wideband known synchronization signal, which tones are null tones, which tones are non-null tones, the power level associated with non-null tones, and the modulation symbol values carried by each of the non-null tones. $N^{th}$ beacon signal information 5566 includes information identifying the $N^{th}$ beacon signal, e.g., information identifying the tone or tones of a $N^{th}$ beacon signal and information identifying the power level associated with the beacon tone or tones. $N^{th}$ wideband known synchronization signal information 5568 includes information identifying: the set of tones of the $N^{th}$ wideband known synchronization signal, which tones are null tones, which tones are non-null tones, the power level associated with non-null tones, and the modulation symbol values carried by each of the non-null tones.

Composite signal format information 5570 includes information identifying and pertaining to the characteristics of a composite signal, e.g., occupies two consecutive OFDM symbol transmission time intervals, tones are not hopped between the two consecutive OFDM symbol transmission time periods corresponding to the composite signal, the signal includes a cyclic prefix portion followed by a body portion followed by an extension portion.

User data signal information 5572 includes information pertaining to signals used to communicate user data, e.g., voice, audio, image, and/or text data information communications in modulation symbols being conveyed by portions of traffic channel segments in an OFDM symbol. User data signal information 5572 includes format information for OFDM symbols conveying user data, e.g., information identifying that such OFDM symbol includes a cyclic prefix portion followed by a body portion and occupy a single OFDM symbol transmission time period. User data signal information 5572 also includes tone hopping information pertaining to successive OFDM symbols which carry user data.

Timing structure information 5576 includes downlink and uplink channel structure information. Downlink channel structure information includes information identifying time intervals in a recurring downlink structure in which composite signals are communicated and time intervals in the recurring downlink structure in which user data signals are communicated.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus of various embodiments, are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communication device to transmit composite signals, comprising:
    transmitting a first composite signal including a first beacon signal and a first wideband synchronization signal, said first wideband synchronization signal including a first plurality of tones said first plurality of tones including at least some null tones and at least some low power tones, said low power tones having an average per tone power less than half the per tone power of any tones of said first beacon signal;
    repeating said step of transmitting said first composite signal; and
    transmitting a second composite signal including a second beacon signal which includes at least one tone which is not used to communicate said first beacon signal and a second wideband synchronization signal, said second wideband synchronization signal including a second plurality of tones said second plurality of tones including at least some null tones and at least some low power tones, said low power tones having an average per tone power less than half the per tone power of any tones of said second beacon signal, said transmitting of said second composite signal being performed during a time period which does not overlap transmission of said first composite signal.

2. The method of claim 1 wherein said second wideband synchronization signal includes non-null tones which are the same as the non-null tones of the first wideband synchronization signal but which communicate on at least one non-zero tone a modulation symbol which is different from the modulation symbol communicated on the at least one non-zero tone of the first wideband synchronization signal.

3. The method of claim 1, wherein at least some non-null tones included in said second wideband synchronization signal are different than the non-null tones included in said first wideband synchronization signal.

4. The method of claim 1, wherein said first and second wideband synchronization signals are unique and map to the first and the second beacon signals, respectively.

5. The method of claim 4, further comprising transmitting a plurality of additional composite signals, each additional composite signal including an additional beacon signal and an additional wideband synchronization signal, each additional wideband synchronization signal including at least some null tones and at least some low power tones, said low power tones having an average per tone power less than half the per tone power of any tones of said additional beacon signals, each additional beacon signal corresponding to a different tone and each additional wideband synchronization signal being unique and corresponding to a single one of said additional beacon signals.

6. A communication device comprising:
    a multi-tone transmitter for transmitting composite signals;
    a control module for controlling said multi-tone transmitter to transmit a first composite signal including a first beacon signal and a first wideband synchronization signal, said first wideband synchronization signal including a first plurality of tones said first plurality of tones including at least some null tones and at least some low power tones, said low power tones having an average per tone power less than half the per tone power of any tones of said first beacon signal and to repeat said transmission of said first composite signal on a recurring basis;
    stored transmission timing information indicating when said first composite signal and a second composite signal are to be transmitted;
    stored signal definition information defining said first and second composite signals; and
    wherein said control module further controls said multi-tone transmitter as a function of said stored transmission timing information and said stored signal definition information to transmit a second composite signal including a second beacon signal which includes at least one tone which is not used to communicate said first beacon signal and a second wideband synchronization signal, said second wideband synchronization signal including a second plurality of tones said second plurality of tones including at least some null tones and at least some low power tones, said low power tones having an average per tone power less than half the per tone power of any tones of said second beacon signal, said transmitting of said second composite signal being performed during a time period which does not overlap transmission of said first composite signal.

7. The communication device of claim 6 wherein said stored signal information indicates that said second wideband synchronization signal include non-null tones which are the same as the non-null tones of the first wideband synchronization signal but which communicate on at least one non-zero tone a modulation symbol which is different from the modulation symbol communicated on the at least one non-zero tone of the first wideband synchronization signal.

8. The communication device of claim 6, wherein said stored signal information indicates that at least some non-null tones included in said second wideband synchronization signal are different than the non-null tones included in said first wideband synchronization signal.

9. The communication device of claim 6, wherein said first and second wideband synchronization signals are unique and map to the first and the second beacon signals, respectively.

10. The communication device of claim 9, further comprising:

additional stored transmission timing information indicating when a plurality of additional composite signals should be transmitted; and additional stored signal definition information defining each of the plurality of additional composite signal to include an additional beacon signal and an additional wideband synchronization signal, each additional wideband synchronization signal including at least some null tones and at least some low power tones, said low power tones having an average per tone power less than half the per tone power of any tones of said additional beacon signals, each additional beacon signal corresponding to a different tone and each additional wideband synchronization signal being unique and corresponding to a single one of said additional beacon signals.

11. A communication device comprising:

means for transmitting multi-tone composite signals;

means for controlling said means for transmitting multi-tone composite signals to transmit a first composite signal including a first beacon signal and a first wideband synchronization signal, said first wideband synchronization signal including a first plurality of tones said first plurality of tones including at least some null tones and at least some low power tones, said low power tones having an average per tone power less than half the per tone power of any tones of said first beacon signal and to repeat said transmission of said first composite signal on a recurring basis;

means for storing transmission timing information indicating when said first composite signal and a second composite signal are to be transmitted;

means for storing signal definition information defining said first and second composite signals; and wherein said control means further controls said multi-tone transmitter as a function of said stored transmission timing information and said stored signal definition information to transmit a second composite signal including a second beacon signal which includes at least one tone which is not used to communicate said first beacon signal and a second wideband synchronization signal, said second wideband synchronization signal including a second plurality of tones said second plurality of tones including at least some null tones and at least some low power tones, said low power tones having an average per tone power less than half the per tone power of any tones of said second beacon signal, said transmitting of said second composite signal being performed during a time period which does not overlap transmission of said first composite signal.

12. The communication device of claim 11 wherein said means for storing signal information stores information indicating that said second wideband synchronization signal include non-null tones which are the same as the non-null tones of the first wideband synchronization signal but which communicate on at least one non-zero tone a modulation symbol which is different from the modulation symbol communicated on the at least one non-zero tone of the first wideband synchronization signal.

13. The communication device of claim 11, wherein said means for storing signal information stores information indicating that at least some non-null tones included in said second wideband synchronization signal are different than the non-null tones included in said first wideband synchronization signal.

14. A computer readable medium storing a computer program, wherein execution of the computer program is for:

transmitting a first composite signal including a first beacon signal and a first wideband synchronization signal, said first wideband synchronization signal including a first plurality of tones said first plurality of tones including at least some null tones and at least some low power tones, said low power tones having an average per tone power less than half the per tone power of any tones of said first beacon signal;

repeating said step of transmitting said first composite signal; and transmitting a second composite signal including a second beacon signal which includes at least one tone which is not used to communicate said first beacon signal and a second wideband synchronization signal, said second wideband synchronization signal including a second plurality of tones said second plurality of tones including at least some null tones and at least some low power tones, said low power tones having an average per tone power less than half the per tone power of any tones of said first beacon signal, said transmitting of said second composite signal being performed during a time period which does not overlap transmission of said first composite signal.

* * * * *

UNITED STATES PATENT AND TRADEMARK OFFICE
CERTIFICATE OF CORRECTION

PATENT NO. : 7,801,227 B2
APPLICATION NO. : 11/486881
DATED : September 21, 2010
INVENTOR(S) : Parizhisky et al.

Page 1 of 1

It is certified that error appears in the above-identified patent and that said Letters Patent is hereby corrected as shown below:

Column 32, line 52, claim 7: "include" to read as --includes--

Column 33, line 5, claim 10: "signal" to read as --signals--

Column 33, line 34, claim 11: "Said multi-tone transmitter" to read as --said means for transmitting multi-tone composite signals--

Column 34, line 8, claim 12: "include" to read as --includes--

Signed and Sealed this
Thirty-first Day of July, 2012

David J. Kappos
*Director of the United States Patent and Trademark Office*